(12) United States Patent
Steiner et al.

(10) Patent No.: US 10,768,772 B2
(45) Date of Patent: Sep. 8, 2020

(54) CONTEXT-AWARE RECOMMENDATIONS OF RELEVANT PRESENTATION CONTENT DISPLAYED IN MIXED ENVIRONMENTS

(71) Applicant: MICROSOFT TECHNOLOGY LICENSING, LLC, Redmond, WA (US)

(72) Inventors: Travis William Steiner, Issaquah, WA (US); Shannon Richard Monroe, Bellevue, WA (US); Emiko Valiane Charbonneau, Kirkland, WA (US); Michal Hlavac, Seattle, WA (US); Brian Murphy, Seattle, WA (US); David M. Hill, Bellevue, WA (US); Jia Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1058 days.

(21) Appl. No.: 14/946,737

(22) Filed: Nov. 19, 2015

(65) Prior Publication Data
US 2017/0147154 A1 May 25, 2017

(51) Int. Cl.
*G06F 3/0481* (2013.01)
*G06F 3/01* (2006.01)
*G06F 16/48* (2019.01)

(52) U.S. Cl.
CPC .......... *G06F 3/0481* (2013.01); *G06F 3/013* (2013.01); *G06F 16/48* (2019.01)

(58) Field of Classification Search
None
See application file for complete search history.

(56) References Cited

U.S. PATENT DOCUMENTS

| | | | | |
|---|---|---|---|---|
| 5,886,683 | A | * | 3/1999 | Tognazzini ............. G06F 3/013 345/156 |
| 6,577,329 | B1 | * | 6/2003 | Flickner .................. G06F 3/013 715/774 |

(Continued)

OTHER PUBLICATIONS

Victor Callaghan1, Michael Gardner, Bernard Horan, John Scott, Liping Shen, Minjuan Wang, A Mixed Reality Teaching and Learning Environment, Aug. 13-15, 2008, 12 pages (Year: 2008).*

(Continued)

*Primary Examiner* — Yongjia Pan
(74) *Attorney, Agent, or Firm* — Newport IP, LLC; Scott Y. Shigeta

(57) ABSTRACT

Techniques for context-aware recommendations of relevant presentation content are disclosed. In some configurations, the techniques involve the processing of contextual data from one or more resources to dynamically direct a presentation. A computing device can receive contextual data from one or more resources. The contextual data can be processed to select one or more sections of content data, e.g., a slide of a slide deck or a page of document. The computing device can then cause a display of the one or more sections on one or more devices. In some configurations, a hardware display surface can be configured to provide a real-world view of an object, e.g., a model or other item that may be related to the presentation, through the hardware display surface while also providing a display of the one or more sections of the presenter's material.

20 Claims, 22 Drawing Sheets

(56) References Cited

U.S. PATENT DOCUMENTS

| | | | |
|---|---|---|---|
| 6,886,137 B2* | 4/2005 | Peck | G06F 3/013 |
| | | | 345/158 |
| 6,968,333 B2* | 11/2005 | Abbott | G06F 17/30867 |
| 6,972,734 B1* | 12/2005 | Ohshima | A63F 13/10 |
| | | | 345/8 |
| 7,736,000 B2* | 6/2010 | Enriquez | A61B 3/113 |
| | | | 351/205 |
| 8,477,425 B2 | 7/2013 | Border et al. | |
| 8,494,215 B2* | 7/2013 | Kimchi | G06F 3/013 |
| | | | 382/103 |
| 8,531,447 B2* | 9/2013 | Walker | G06T 17/10 |
| | | | 345/418 |
| 8,571,851 B1* | 10/2013 | Tickner | G06F 17/2785 |
| | | | 704/1 |
| 8,732,097 B2* | 5/2014 | Zhang | G06Q 30/02 |
| | | | 706/12 |
| 8,879,155 B1* | 11/2014 | Teller | G06K 9/00604 |
| | | | 359/630 |
| 8,902,303 B2* | 12/2014 | Na'Aman | G09B 21/006 |
| | | | 348/61 |
| 9,019,174 B2 | 4/2015 | Jerauld | |
| 9,153,195 B2* | 10/2015 | Geisner | G09G 5/00 |
| 9,230,221 B2* | 1/2016 | Gobert | G06N 99/005 |
| 9,240,127 B2* | 1/2016 | Wong | H04N 21/25866 |
| 9,448,623 B2* | 9/2016 | Fein | G06F 3/011 |
| 9,569,549 B1* | 2/2017 | Jenkins | G06F 3/0483 |
| 9,703,373 B2* | 7/2017 | Kohlhoff | G06F 3/013 |
| 2004/0105573 A1* | 6/2004 | Neumann | G06T 17/00 |
| | | | 382/103 |
| 2009/0138332 A1 | 5/2009 | Kanevsky et al. | |
| 2009/0243968 A1* | 10/2009 | Nakazawa | A63F 13/02 |
| | | | 345/8 |
| 2010/0164990 A1* | 7/2010 | Van Doorn | G02B 27/017 |
| | | | 345/633 |
| 2012/0194419 A1* | 8/2012 | Osterhout | G02B 27/0093 |
| | | | 345/156 |
| 2013/0021373 A1 | 1/2013 | Vaught et al. | |
| 2013/0044128 A1* | 2/2013 | Liu | G09G 5/00 |
| | | | 345/633 |
| 2013/0054576 A1* | 2/2013 | Karmarkar | G06F 17/30861 |
| | | | 707/722 |
| 2013/0137076 A1 | 5/2013 | Perez et al. | |
| 2013/0278631 A1* | 10/2013 | Border | G02B 27/017 |
| | | | 345/633 |
| 2013/0290339 A1* | 10/2013 | LuVogt | G06F 17/30867 |
| | | | 707/740 |
| 2013/0293577 A1 | 11/2013 | Perez et al. | |
| 2013/0300634 A1* | 11/2013 | White | G02B 27/0075 |
| | | | 345/7 |
| 2013/0300637 A1 | 11/2013 | Smits et al. | |
| 2014/0049559 A1 | 2/2014 | Fleck et al. | |
| 2014/0052567 A1* | 2/2014 | Bhardwaj | G06Q 30/0631 |
| | | | 705/26.7 |
| 2014/0098127 A1* | 4/2014 | Fein | G06F 3/011 |
| | | | 345/633 |
| 2014/0160001 A1 | 6/2014 | Kinnebrew et al. | |
| 2014/0180760 A1* | 6/2014 | Karatzoglou | G06Q 30/0269 |
| | | | 705/7.29 |
| 2014/0184496 A1* | 7/2014 | Gribetz | G02B 27/017 |
| | | | 345/156 |
| 2014/0184550 A1* | 7/2014 | Hennessey | G06F 3/013 |
| | | | 345/173 |
| 2014/0267411 A1* | 9/2014 | Fein | G06F 16/29 |
| | | | 345/633 |
| 2014/0310595 A1* | 10/2014 | Acharya | G06F 9/453 |
| | | | 715/706 |
| 2015/0032766 A1 | 1/2015 | Greenbaum | |
| 2015/0106467 A1* | 4/2015 | Robarts | G06F 17/30867 |
| | | | 709/207 |
| 2015/0162000 A1* | 6/2015 | Di Censo | G10L 15/22 |
| | | | 704/270.1 |
| 2015/0378432 A1* | 12/2015 | Abdollahi | G02B 27/0172 |
| | | | 345/8 |
| 2016/0132752 A1* | 5/2016 | Qvarfordt | G06K 9/00617 |
| | | | 382/103 |
| 2016/0358181 A1* | 12/2016 | Bradski | G06Q 20/40145 |

OTHER PUBLICATIONS

Matt Dunleavy and Chris Dede, Augmented Reality Teaching and Learning, 2014, 11 pages (Year: 2014).*

Penaflorida, Rexly, "Altspace VR Open Beta: 'Skype, With Presence' (Updated)", Published on: May 19, 2015, Available at: http://www.tomshardware.com/news/ altspacevr-brings-vr-users-together,29129.html, 4 pages.

Superhumanlabs.com, "YourShow on Glass", Published on: Oct. 22, 2013 Available at: https://yourshow.superhumanlabs.com/, 2 pages.

"View your speaker notes privately, while delivering a presentation on multiple monitors", Retrieved on: Jul. 15, 2015, available at: https://support.office.com/en-sg/article/ View-your-speaker-notes-privately-while-delivering-a-presentation-on-multiple-monitors-ccfa1894-e3ef-4955-9c3a-444d58248093, 3 pages.

Wijnia, Sybren, "Towards an interactive Virtual Storyteller", In Proceedings of 3rd Twente Student Conference on IT, Jun. 2005, 9 pages.

* cited by examiner

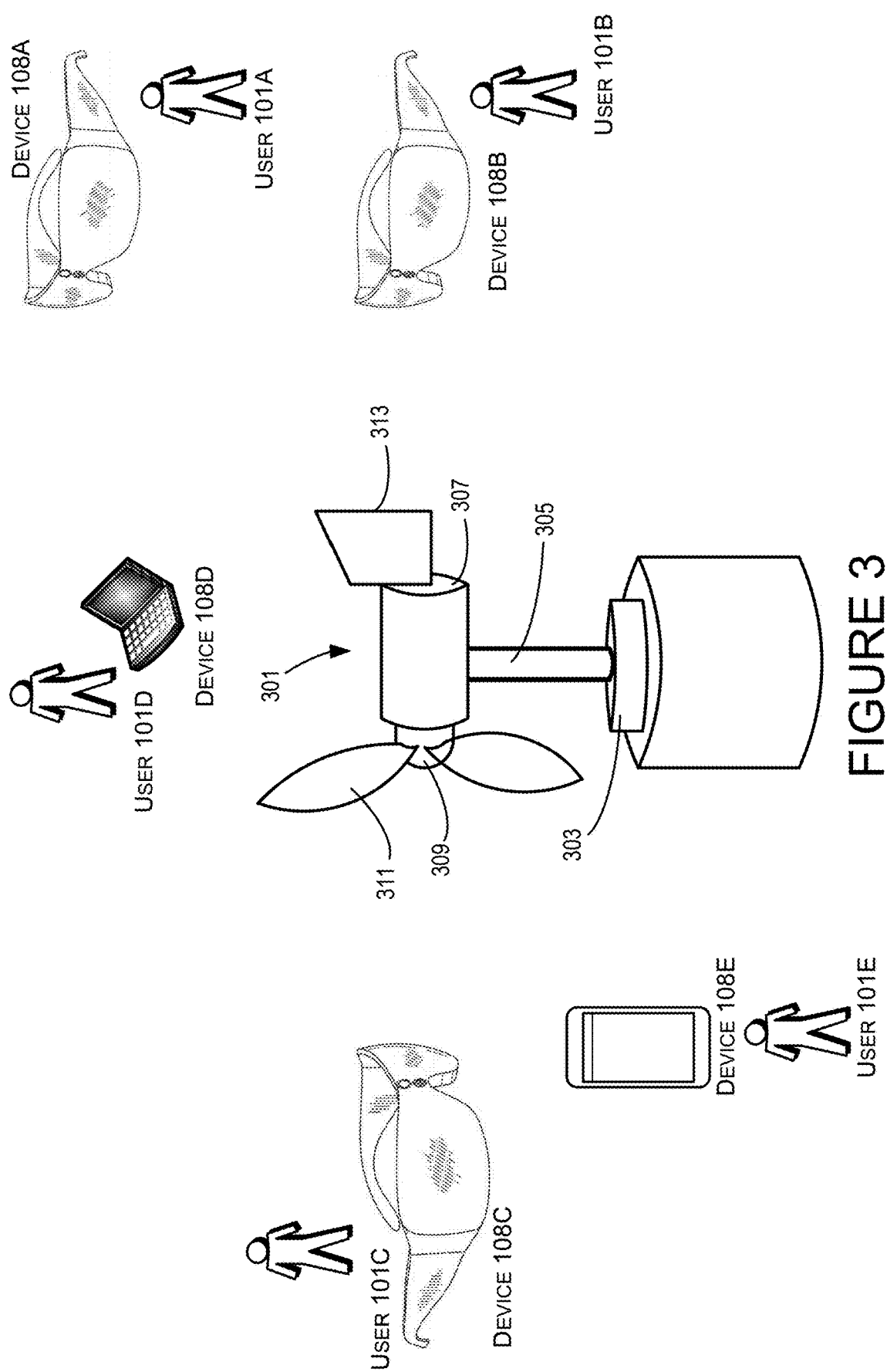

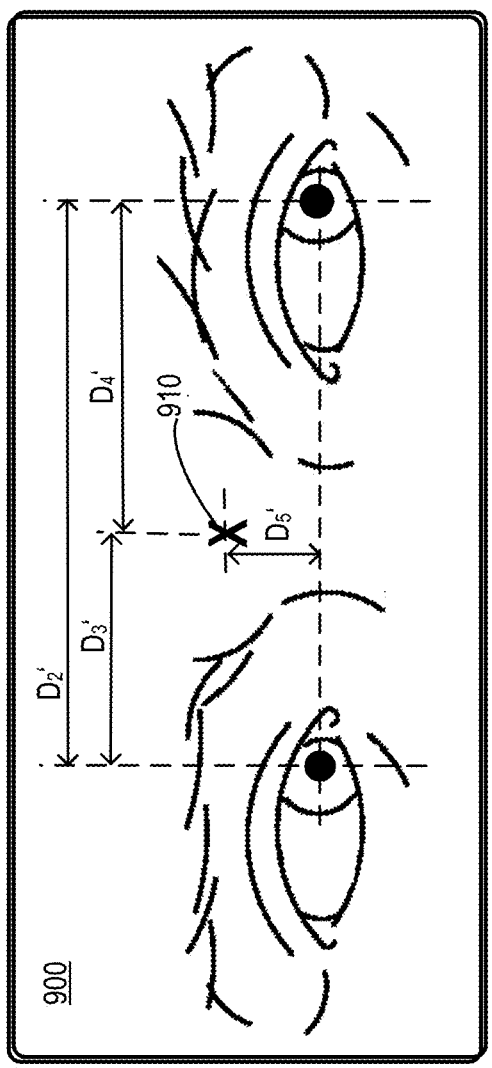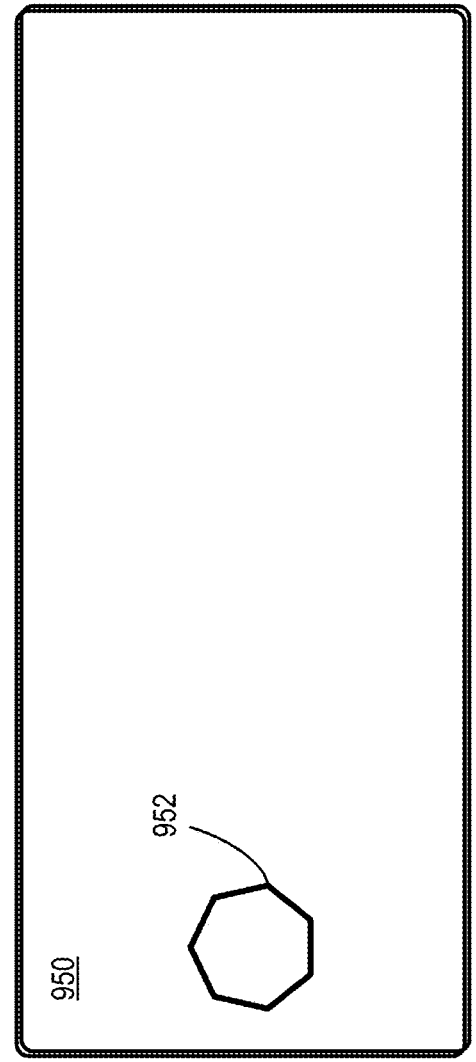
FIGURE 9C
FIGURE 9D

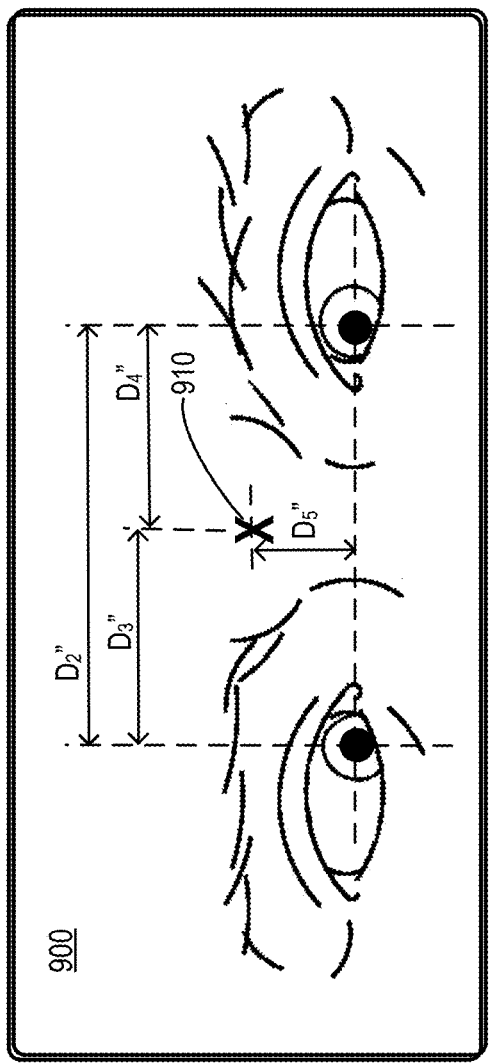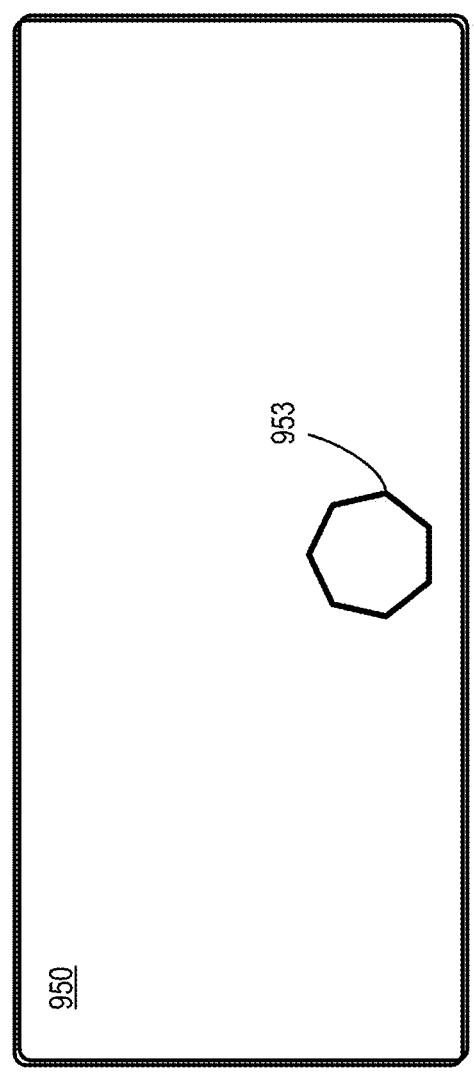
FIGURE 9E
FIGURE 9F

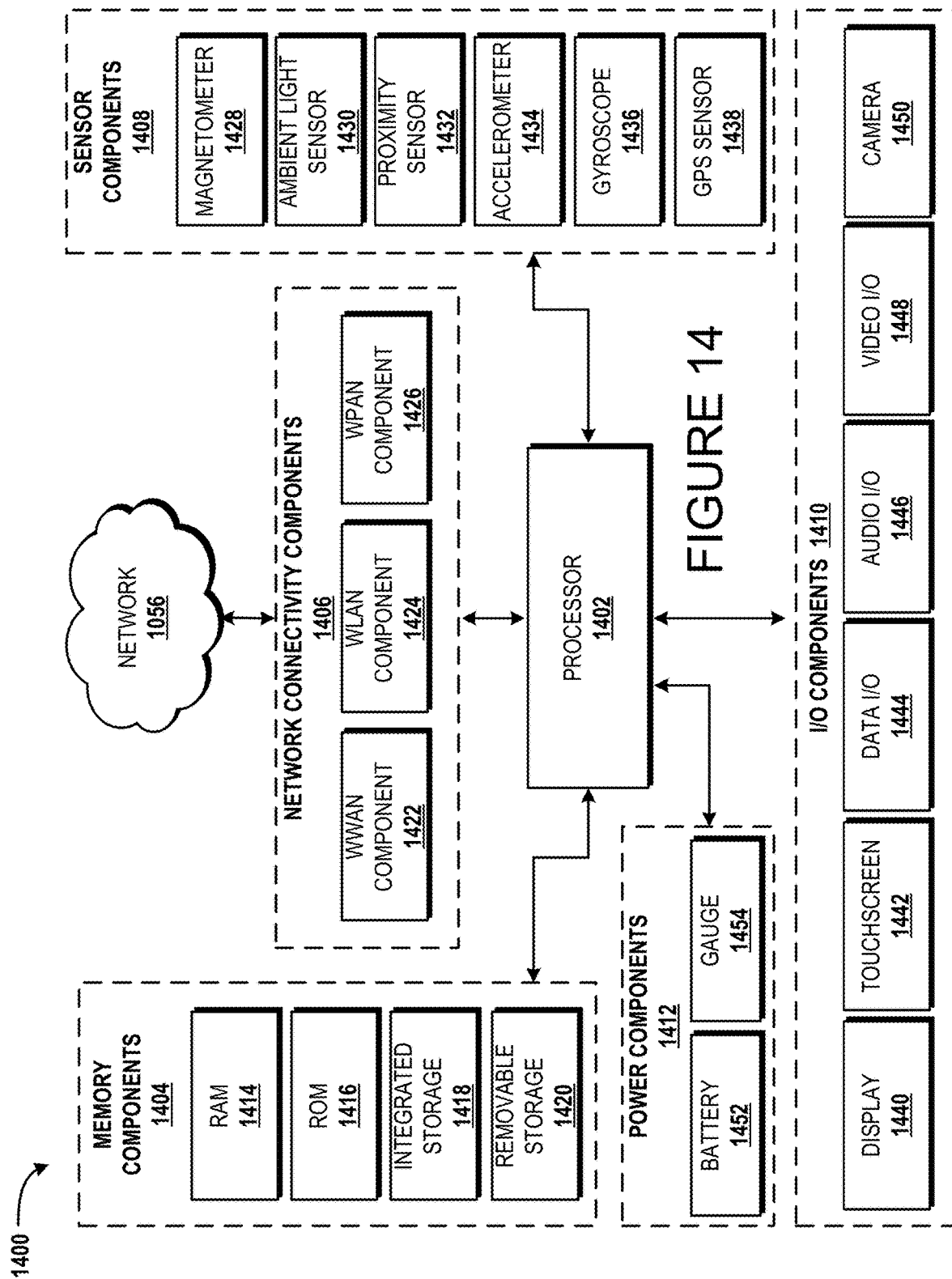

CONTEXT-AWARE RECOMMENDATIONS OF RELEVANT PRESENTATION CONTENT DISPLAYED IN MIXED ENVIRONMENTS

BACKGROUND

Delivering a compelling presentation to an audience can be challenging. Regardless if an audience is one person or millions of people, presenters must balance a multitude of concerns to engage an audience and effectively react to any type of interruption, question, or changed scenario. There are a number of devices and software applications designed to assist presenters with such concerns. For example, some applications allow presenters to display a document or a slide deck to an audience. Other tools, such as timers and electronic cue cards, can also help presenters stay on task.

Although existing technologies can provide assistance to presenters, some existing systems still require presenters to manage their presentation materials, which may require a presenter to navigate through a static document. This approach requires presenters to remember the outline of their presentation materials to react appropriately to questions and other cues. Such tasks can be particularly difficult when presenters have to navigate through a large, complex document or slide deck. In addition, a presenter is often balancing his or her attention between the audience, notes, and other cues. In such scenarios, it may be difficult to maximize audience engagement, particularly when presenting to large a group of people with diverging interests and different levels of knowledge with respect to presented topics.

It is with respect to these and other considerations that the disclosure made herein is presented.

SUMMARY

Technologies described herein provide context-aware recommendations of relevant presentation content displayed in mixed environments. Generally described, the techniques disclosed herein involve the processing of contextual data from one or more resources to dynamically direct a presentation. In some configurations, a computing device can receive presentation data, e.g., a slide deck or a document, that includes a number of sections pertaining to one or more topics. The computing device can also be configured to receive contextual data from one or more remote computing devices. For example, the contextual data can define any type of user activity, such as a user's gestures, voice commands, gaze direction, or a user's interaction with one or more devices or objects. In another example, the contextual data can also identify a gaze target, i.e., an object or part of an object that a user is looking at.

The contextual data can be analyzed to generate data defining one or more topics of interest. The configurations disclosed herein can generate one or more recommendations based, at least in part, on the topics of interest. For example, the data defining one or more topics of interest can be used to search the presentation data to select one or more sections of the presentation data, e.g., a slide of a slide deck or a page of document, related to the topics of interest. The computing device can then cause a display of the one or more selected sections on one or more devices. In some configurations, a hardware display surface of the one or more devices can be configured to provide a real-world view of an object, e.g., a model or other item that may be related to the presentation, through the hardware display surface while also providing a display of the one or more sections of the presentation data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates an example scenario where a user of a computing device is delivering a presentation to audience members associated with one or more devices;

FIGS. 9A-9F illustrate several example scenarios where a device is used to calibrate one or more devices;

FIG. 14 is a computer architecture diagram illustrating a computing device architecture for a computing device capable of implementing aspects of the techniques and technologies presented herein.

DETAILED DESCRIPTION

Figure 1:
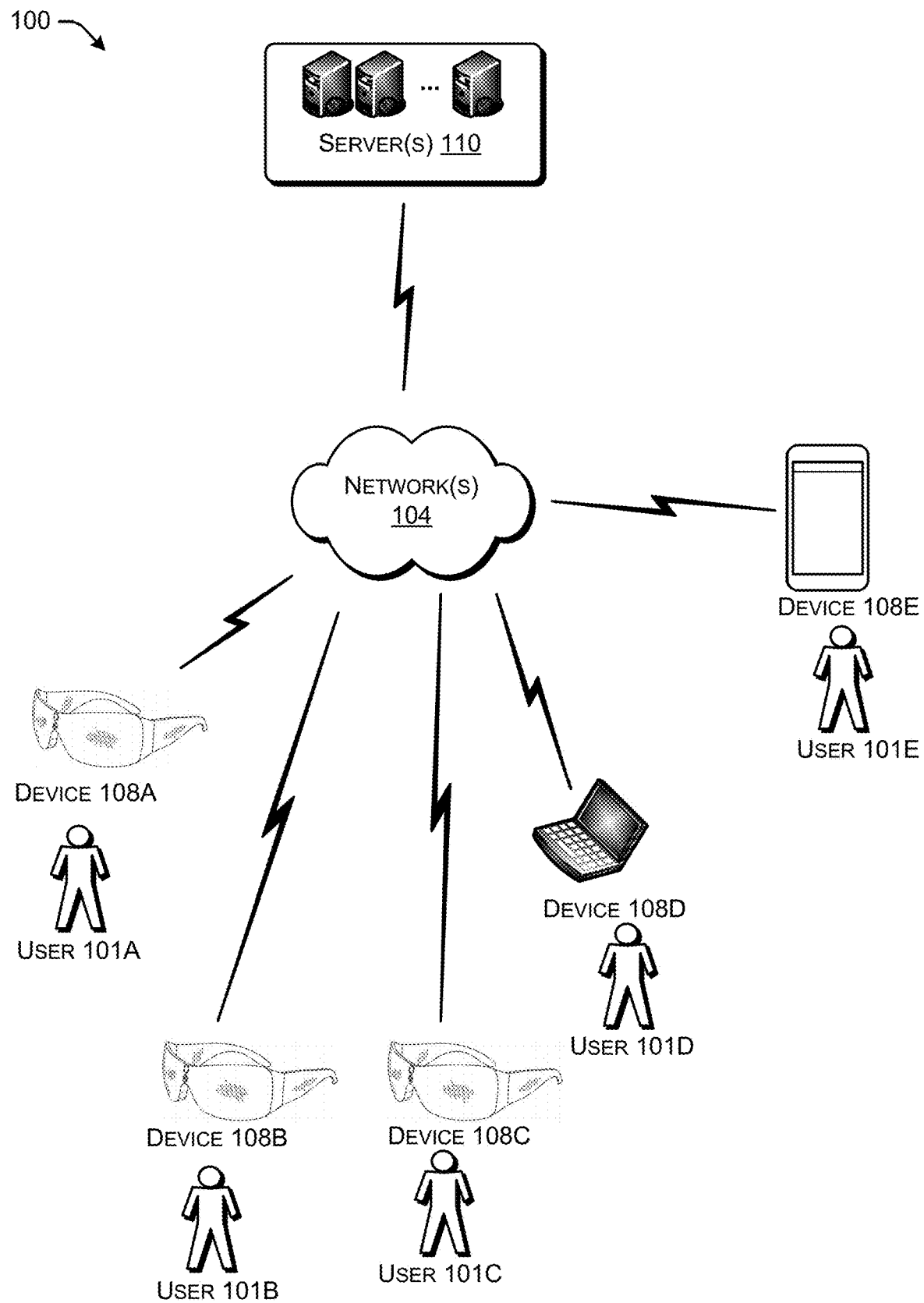
FIG. 1 is a block diagram showing several example devices for enabling context-aware recommendations of relevant presentation content displayed in mixed environments.

The following Detailed Description describes technologies enabling context-aware recommendations of relevant presentation content displayed in mixed environments. In some configurations, a computing device can receive content data including a number of sections pertaining to one or more topics. The content data can be, for example, a slide deck, document, or web page having a number of sections. For illustrative purposes, content data can be provided by a presenter. The content data can be retrieved from any number of sources, such as a local storage device, remote storage service, such as GOOGLE DRIVE, ONEDRIVE, or a service, server, or platform, such as a social network or a Website.

The computing device can also be configured to receive contextual data from one or more resources. For example, the contextual data can be received from one or more devices configured to capture and interpret any type of user activity, and the contextual data can define user activity such as a user's gestures, voice commands, gaze direction, or a user's interaction with one or more devices or objects. In other examples, the contextual data can define user interactions with one or more systems, such as a social network, search engine, email system, instant message ("I.M.") system, or any other suitable application or platform. In yet another example, the contextual data can also identify a gaze target, i.e., an object or part of an object that a user is looking at.

The contextual data can be processed and/or analyzed to identify at least one topic of interest. For example, if one or more members of an audience are looking at an object, reading a section of text, or performing a particular gesture, contextual data defining such activity can be used to determine a topic of interest. As will be described in more detail below, by the use of any number of suitable technologies, data defining a topic of interest can be generated by an interpretation of such user activity. In addition, data defining a topic of interest can also be generated by processing and/or analyzing communication data and/or other forms of data defining user activity. In some configurations, the data defining a topic of interest can include keywords, text descriptions, images, tags, links, or other suitable forms of data.

Configurations disclosed herein can select one or more sections of the content data based, at least in part, on the data defining the identified topics of interest. In some configurations, the data defining one or more topics of interest can be used to search the content data to identify one or more sections of the content data. For example, if a presenter has a slide deck with hundreds of slides, the techniques disclosed herein can utilize the data defining one or more topics of interest and/or other data to select one or more slides that are of interest to the audience.

The computing device can take one or more actions based on data defining the selected sections. For example, a recommendation including the selected sections can be communicated to a user, such as the presenter. The user receiving the recommendation may accept or reject the recommendation. The computing device can cause a display of the one or more sections on a hardware display surface of one or more devices. The display of the one or more sections can be automatically displayed to one or more users, or the display of the one or more sections can be in response to an approval by a user, such as the presenter. By dynamically selecting one or more sections of presentation data based on contextual data received from multiple sources, configurations disclosed herein can dynamically direct a presentation.

In some configurations, the hardware display surface can be configured to provide a real-world view of an object through the hardware display surface while also providing a rendered display of one or more sections of the presenter's material. The object, for example, can include a model, prop, or other item that can be related to the content data. As will be described in more detail below, some configurations enable a device to graphically associate holographic UIs and other graphical elements with an object seen through the hardware display surface or rendered objects displayed on the hardware display surface.

In addition to providing recommendations based on the analysis of the contextual data, the techniques disclosed herein can also collect various forms of contextual data over time for machine learning purposes. As content data, e.g., a presentation, is used over time, questions from an audience, gestures received from an audience, and other contextual data can be used to build a database for the purposes of improving the accuracy of the recommendations as a presenter uses the presentation data. In some configurations, the techniques disclosed herein can also modify the content data based on the collected information.

By the use of the technologies described herein, contextual data from a number of resources can be utilized to dynamically guide a presentation. Such technologies improve user interaction with a device by automatically suggesting salient sections of content data. Such configurations may be beneficial in assisting a presenter, particularly when the presenter has large volumes of presentation data. Among many benefits provided by the technologies described herein, a user's interaction with a device may be improved, which may reduce the number of inadvertent inputs, reduce the consumption of processing resources, and mitigate the use of network resources. Other technical effects other than those mentioned herein can also be realized from an implementation of the technologies disclosed herein.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

While the subject matter described herein is primarily presented in the general context of techniques for providing context-aware recommendations of relevant presentation content displayed in mixed environments, it can be appreciated that the techniques described herein may apply to any type of scenario where two or more people are in communication with one another.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing context-aware recommendations of relevant presentation content displayed in mixed environments. As will be described in more detail below with respect to FIGS. 12-14, there are a number of applications and services that can embody the functionality and techniques described herein.

FIG. 1 is a system diagram showing aspects of one example environment 100, also referred to herein as a "system 100," disclosed herein for providing context-aware recommendations of relevant presentation content displayed in mixed environments. In one illustrative example, the example environment 100 can include one or more servers 110, one or more networks 104, and one or more devices 108A through 108E (collectively "devices 108") respectively associated with users 101A through 101E (collectively "users 108"). This example is provided for illustrative purposes and is not to be construed as limiting. It can be appreciated that the example environment 100 can include any number of devices 108, any number of users 108, and/or any number of servers 110.

A device 108, also referred to herein as a "computing device 108," can operate as a stand-alone device, or a device 108 can operate in conjunction with other computers, such as the one or more servers 110. A device 108 can be in the form of a personal computer, a wearable computer, including a head-mounted display (HMD) or watch, or any other computing device having components for interacting with one or more users 101. As can be appreciated, the devices 108, servers 110 and/or any other computer can be interconnected through one or more local and/or wide area networks, such as the network 104. In addition, the devices 108 can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

The servers 110 may be in the form of a personal computer, server farm, large-scale system or any other computing system having components for processing, coordinating, collecting, storing, and/or communicating data between one or more devices 108. In some configurations, the servers 110 can be associated with one or more service providers. A service provider can be a company, person or any type of entity that shares or leases computing resources for facilitating aspects of the techniques disclosed herein. The servers 110 can also include components and services, such as the application services and shown in FIG. 13, for providing or processing contextual data and executing one or more aspects of the techniques described herein. As will be described in more detail herein, any suitable module may operate in conjunction with other modules or devices to implement aspects of the techniques disclosed herein.

Figure 2:
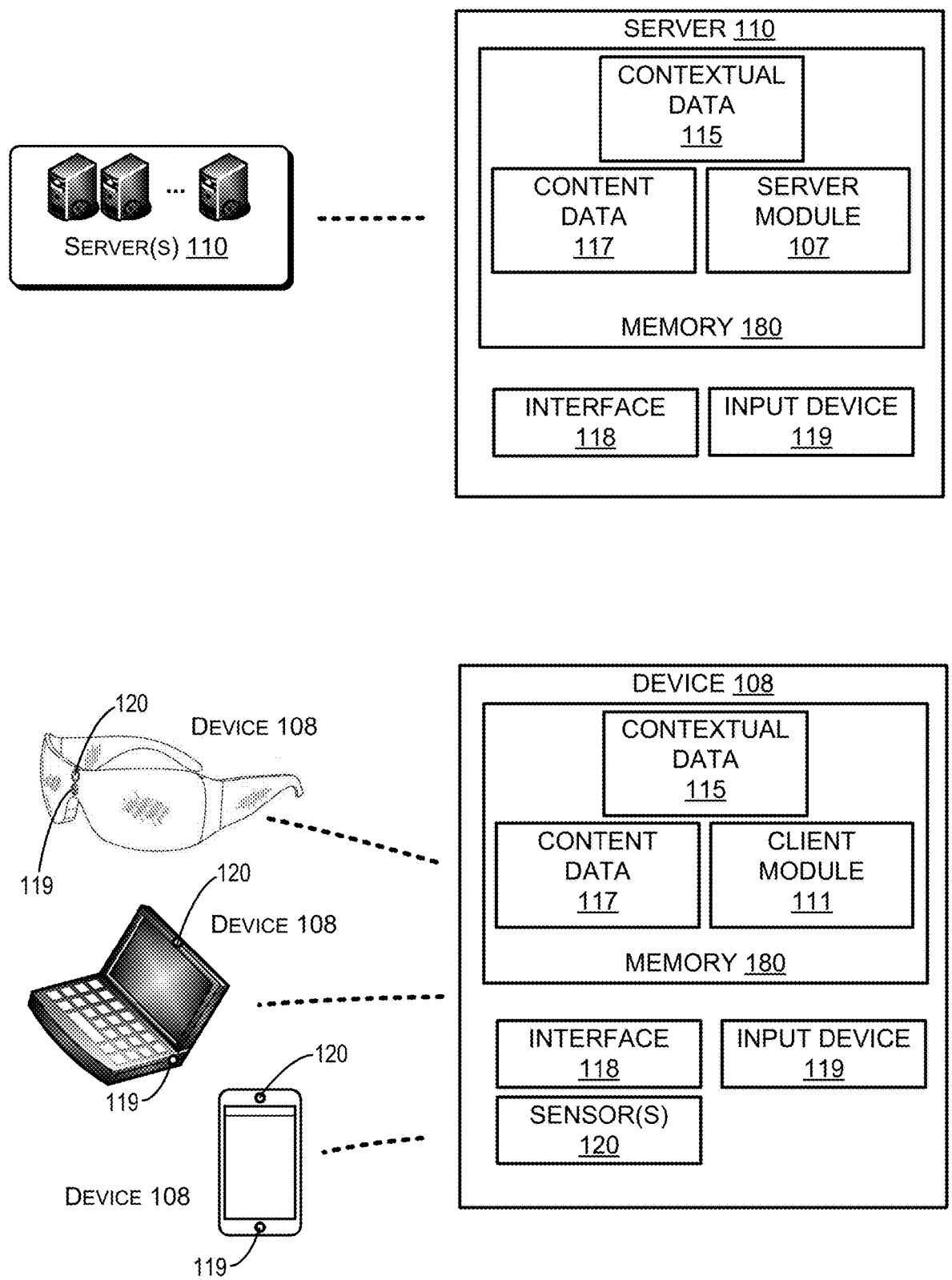
FIG. 2 is a block diagram showing several example components of the devices shown in FIG. 1.

Referring now to FIG. 2, aspects of the devices 108 and servers 110 are described in more detail. In one illustrative example, a server 110 can include a local memory 180, also referred to herein as a "computer-readable storage medium," configured to store data, such as contextual data 115 and content data 117. As will be described in more detail below, contextual data 115 can be generated by one or more devices 108 or servers 110 and is utilized to identify one or more sections of content data 117, which can be in the form of a slide deck, document, or the like. The data stored on one or more servers 110 can be a duplicate copy of data stored on the devices 108 to allow a centralized service to coordinate aspects of a number of client computers, such as the devices 108.

In some configurations, an individual server 110 can include a server module 107 configured to execute one or more aspects of the techniques described herein. The server 110 can also include a hardware display surface 118 configured to display content. For illustrative purposes, the hardware display surface 118 is also referred to herein as an "interface 118." In addition, server 110 can also include an input device 119, such as a keyboard, mouse, microphone, camera, or any other device suitable to generate a signal and/or data defining any user interaction with the server 110. In some configurations, the servers 110 can be configured to allow a user to interact with the servers 110 from a remote location.

In some configurations, an individual device 108 can include a local memory 180 that stores content data 117 in any suitable data structure. The content data 117 can include any data that is used for communicating authored content between two or more users 101. For example, the content data 117 can include a document, slide deck or any other suitable file format that can be used for assisting a user in sharing and/or presenting one or more concepts. Examples of content data 117 can include, but is not limited to, a KEYNOTE file, PAGES file, GOOGLE SLIDES file, GOOGLE DOCS file, GOOGLE SHEETS file, WORD file, POWERPOINT file, EXCEL file, etc. In other examples, content data 117 can also be in the form of an image file, a text file, a markup document, and/or a combination of formats. For illustrative purposes, content data 117 can include one or more sections, and individual sections can include content describing one or more topics. For example, a section can be a page, a group of pages, a slide, a group of slides, a chapter, or any other grouping or collection of data. Sections can be defined by any type of indicator, such as a page break, heading, title, text, symbol, or any other suitable indicator.

The memory 180 can also be used to store contextual data 115 in any suitable data structure. As summarized above, the contextual data 115 can be received from any number of devices and can be in any format. For example, the contextual data 115 can be received from one or more devices 108 configured to capture and interpret any type of user activity, such as a user's gestures, voice commands, gaze direction, or any other type of activity. In other examples, the contextual data 115 can be received from one or more systems, such as a social network, email system, search engine, instant message system, or any other suitable application or platform. Examples of such systems can include the services and resources (1314-1324) shown in FIG. 13.

The contextual data 115 can include other data, such as a user's profile, a status, preferences, and other information associated with an object, such as a user 101, device 108 or a model used in a presentation. In some configurations, the contextual data 115 can define a user scenario, e.g., a number of people in an audience, objects they are looking at, a context derived from communication between the users, etc. As will be described below, the contextual data 115 can be used to identify topics of interest of an audience or group of users of any size. Additional details of the contextual data 115 are provided in the examples described below.

The memory 180 can also be used to store a client module 111 configured to manage techniques described herein and interactions between a user and the device 108. For example, as will be described in more detail below, the client module 111 can be configured to process and communicate the contextual data 115, the content data 117, and other data. In addition, the client module 111 can be configured to execute one or more surface reconstruction algorithms and other algorithms for locating objects and capturing images of said objects. The client module 111 may be in the form of a productivity application, game application, a virtual reality application, an operating system component or any other application configured to, among other techniques disclosed herein, display and process contextual data 115 and content data 117. As will be described herein, the client module 111 is configured to allow a user to interact with a virtual world environment and an augmented reality environment.

In some configurations, an individual device 108 can include a hardware display surface 118 configured to display the content data 117 and other views and renderings described herein. The hardware display surface 118 can include one or more components, such as a projector, screen, or other suitable components for producing a display of an object and/or data. In some configurations, the hardware display surface 118 may be configured to cover at least one eye of a user. In one illustrative example, the hardware display surface 118 may include a screen configured to cover both eyes of a user. The hardware display surface 118 can render or cause the display of one or more images for generating a view or a stereoscopic image of one or more objects. For illustrative purposes, an object can be an item, data, device, person, place, or any type of entity. In a specific example, an object can be a model used by a presenter for demonstrating one or more concepts.

The hardware display surface 118 may be configured to allow a user 101 to view objects from different environments. In some configurations, the hardware display surface 118 can display a rendering of an object. In addition, some configurations of the hardware display surface 118 can allow a user 101 to see through selectable sections of the hardware display surface 118 having a controllable level of transparency, enabling the user 101 to view objects in his or her surrounding environment. For illustrative purposes, a user's perspective looking at objects through the hardware display surface 118 is referred to herein as a "real-world view" of an object or a "real-world view of a physical object." As will be described in more detail below, computer generated renderings of objects and/or data can be displayed in, around, or near the selected portions of the hardware display surface 118 enabling a user to view the computer generated renderings along with real-world views of objects observed through the selected portions of the hardware display surface 118.

Some configurations described herein provide both a "see through display" and an "augmented reality display." For illustrative purposes, the "see through display" may include a transparent lens that can have content displayed on it. The "augmented reality display" may include an opaque display that is configured to display content over a rendering of an image, which may be from any source, such as a video feed from a camera used to capture images of an environment.

For illustrative purposes, some examples disclosed herein describe a display of rendered content over a display of an image. In addition, some examples disclosed herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" display.

An individual device 108 can include an input device 119, such as a keyboard, mouse, microphone, touch sensor, or any other device configured to enable the generation of data characterizing interactions with the device 108. An individual device 108 can also include one or more sensors 120, such as a depth map sensor, camera, light field sensor, gyroscope, sonar sensor, infrared sensor, compass, accelerometer, and/or any other device or component for detecting a position or movement of the device 108 and other objects. The sensors 120 can also enable the generation of data characterizing interactions, such as user gestures, with the device 108. For illustrative purposes, the one or more sensors 120 and/or an input device 119 can enable the generation of contextual data 115 defining a position and aspects of movement, e.g., speed, direction, acceleration, of one or more objects, which can include devices 108, physical items near a device 108, and/or users 101. In other examples, the sensors 120 and/or input device 119 can enable the generation of contextual data 115 defining the presence of, and/or characteristics of, an object. For instance, such components can determine a color, size, shape, or other physical characteristics.

In one illustrative example, the sensors 120 and/or input device 119 can enable the generation of contextual data 115 identifying an object that a user 101 is looking at, which is also referred to herein as a "gaze target." In some configurations, a gaze target can be identified by the use of sensors 120 and/or input devices 119 enabling the generation of data identifying a direction in which a user is looking, which is also referred to herein as a "gaze direction." For example, a sensor 120, such as a camera or depth map sensor, mounted to a device 108 can be directed towards a user's field of view. Image data generated from the sensor 120 can be analyzed to determine if an object in the field of view is in a pre-determined position or area of an image of the image data. If an object is positioned within a pre-determined area of at least one image, such as the center of the image, a device can determine that the object is a gaze target.

Other types of sensors 120 and/or other data can be utilized to identify a gaze target and a gaze direction. For instance, a compass, positioning tracking component (e.g., a GPS component), and/or an accelerometer may be used to generate data indicating a gaze direction and data indicating the location of a particular object. Using such data, the techniques disclosed herein can determine that the particular object is a gaze target. Other data, such as data indicating a speed and direction in which an object is moving can also be used to identify a gaze direction and/or a gaze target.

In some configurations, one or more sensors 120 can be directed toward at least one eye of a user. Data indicating the direction and/or position of at least one eye can be used to identify a gaze direction and a gaze target. Such configurations can be used when a user is looking at a rendering of an object displayed on a hardware display surface 118. In one illustrative example, if an HMD worn by a user has two distinct objects rendered on the hardware display surface 118, the one or more sensors 120 directed toward at least one eye of a user can enable the generation of data indicating if the user is looking at the first rendered object or the second rendered object. Additional details of a configuration having one or more sensors 120 directed toward at least one eye of a user are provided below and shown in FIG. 8A through FIG. 10F. Such configurations can be used with other techniques disclosed herein to enable a device 108 to identify a gaze target.

In some configurations, one or more devices 108 can be configured to identify a topic of interest. As will be described in more detail below, a topic of interest can be determined in a number of ways. For example, data defining a topic can be generated by an analysis of contextual data 115 defining any type of user activity, such as a user's gestures, voice commands, gaze direction, or any other type of input. In other examples, data defining a topic can be generated by an analysis of contextual data 115 received from one or more systems, such as a social network, email system, phone system, instant message system, or any other suitable application or platform.

In one illustrative example, contextual data 115 identifying a gaze target and/or a gaze direction can be analyzed to identify a topic of interest. For example, contextual data 115 received from one or more devices 108 can indicate that a user is looking at a particular object, an image of which can be rendered on a hardware display surface 118 or viewed through the hardware display surface 118. The size, shape, location, or any characteristic of the object may be used to determine a topic associated with the object.

To enable aspects of such configurations, image data associated with an object can be used to retrieve or generate other contextual data 115, e.g., keywords, metadata, summaries, or other descriptive data associated with the object. For instance, an image search can be performed on one or more search engines. A search engine or another suitable resource can provide data, such as related keywords, summaries, or other descriptive data associated with the object. Such an example is provided for illustrative purposes and is not to be construed as limiting. It can be appreciated that other contextual data 115 can be retrieved from any service or resource, such as a personal storage device or data store.

In another illustrative example, image data used to render one or more objects can be analyzed to identify a topic of interest. For illustrative purposes, consider an example where a user is viewing a rendering of two distinct three-dimensional (3-D) models. In such a scenario, the techniques disclosed herein can utilize data indicating a gaze direction of a user to determine if the user is looking at the first object versus the second object. In addition, image data used to render the first object can be used to determine that the user has rotated the first object and that the user is looking at the back of the rotated object. Such data, e.g., data indicating that a user is looking at a particular part of an object, can be processed to determine a topic of interest.

In yet another illustrative example, contextual data 115 identifying a gaze target and/or a gaze direction can be analyzed to determine if the user is looking at a particular section of a document. For example, if a user is holding a paper print of a file or looking at a rendering of a file, one or more devices can interpret the contents of the file and determine a topic of interest based on the printed or rendered contents. A similar analysis may be performed on data that is communicated between one or more users 101. For instance, if a user is sending instant messages or emails, the contents of such communications may be analyzed to determine a topic of interest.

Other forms of input can also be utilized to determine a topic of interest. For instance, if a user points at a particular object or expresses one or more gestures indicating an interest in an object, data characterizing such user activity can be analyzed to determine a topic of interest. In yet another example, if a user is communicating through a device, e.g., a phone or I.M. system, the communication data can be analyzed to determine a topic of interest. In still yet another example, a device can detect that a user is entering search strings in a search engine. Data describing the search strings or the results generated by a search engine can be used to determine a topic of interest.

In addition, combinations of different types of contextual data 115 can be used to determine a topic of interest. For instance, communication data and data identifying a gaze target can be used to determine a topic of interest. Known technologies for analyzing voice, text, images, or other data can be used for deriving keywords or other data indicating a topic of interest. These examples are provided for illustrative purposes and are not to be construed as limiting. It can be appreciated that any type of contextual data 115 and other data can be used to identify a topic of interest. Additional details of such configurations are provided in the examples described below.

As summarized above, data defining a topic of interest can be used to select one or more sections of content data 117. To help guide a presentation, the selected sections of content data 117 can be recommended to a user and/or displayed to one or more users, which may be members of an audience. For example, if a presenter provides a slide deck having hundreds of slides, the techniques disclosed herein can identify one or more topics that may be of interest to an audience. Based on those identified topics, the techniques disclosed herein can provide a recommendation for the presenter to advance to particular slides that are of interest. Such techniques may be beneficial in maximizing audience engagement, particularly when an audience involves a large group of people with diverging interests and different levels of knowledge with respect to the presented topics.

Referring now to FIG. 3, aspects of an example scenario involving a presenter, e.g., the first user 101A, and a number of users 101B-101E (also referred to herein as an "audience" or "audience members") are shown and described below. In this example, the users 101A-101E are positioned around an object 301, which in this example is a model of a wind turbine. The wind turbine has a number of components such as a base 303, support shaft 305, housing 307, nosecone 309, one or more blades 311, and a tail fin 313. Each user 101A-101D can have a different position with respect to the object 301. For example, the third user 101C is positioned in front of the object 301, the second user 101B is positioned behind the object 301, the fourth user 101D is positioned near a side of the object 301, etc.

Figure 4A:
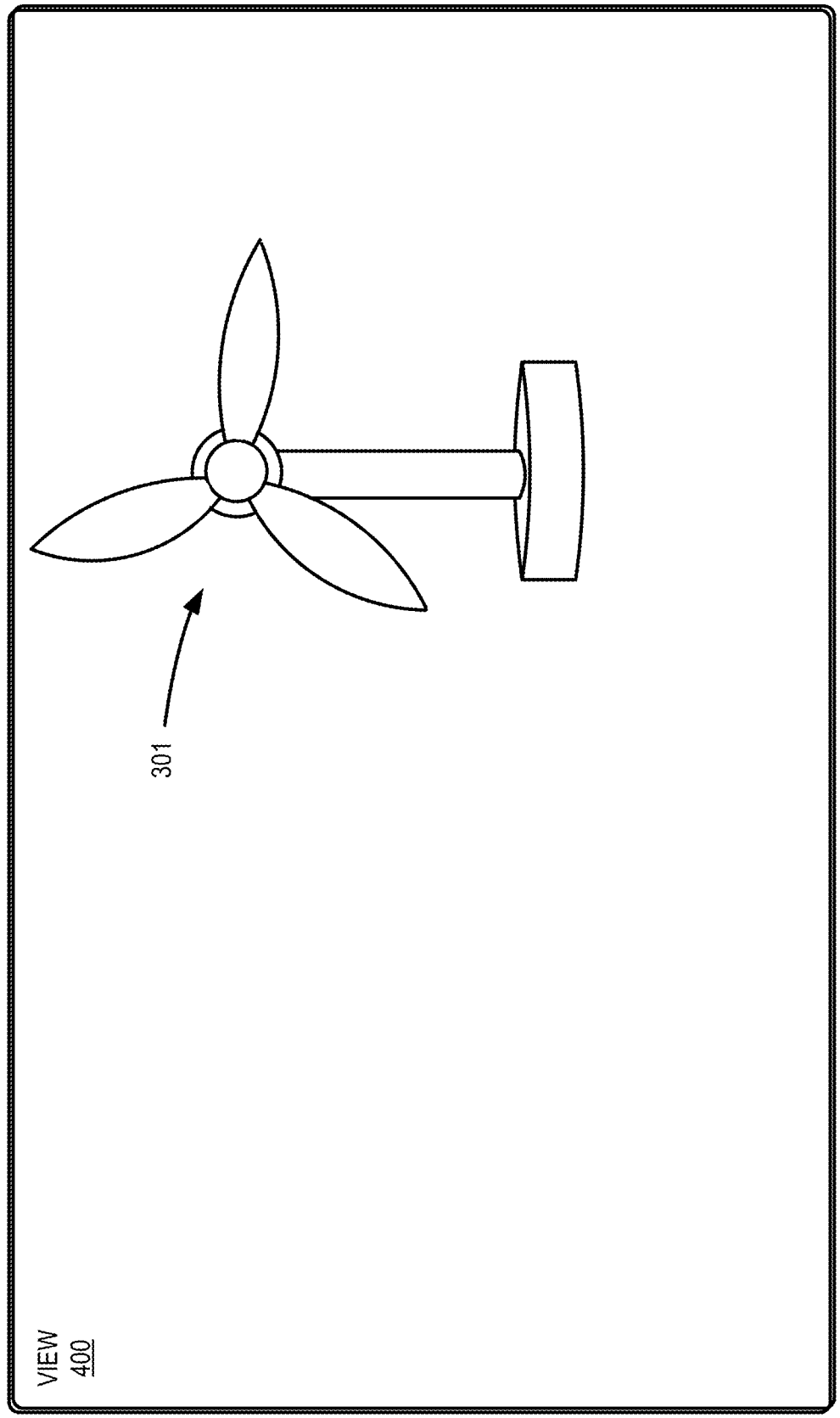
FIGS. 4A-4C illustrate several example views that are displayed to audience members.

FIG. 4A illustrates one example view 400 that is from the perspective of the third user 101C utilizing the third device 108C. In this example, the view 400 includes a real-world view of the object 301 through the hardware display surface 118 of the third device 108C. Although this example view 400 illustrates a configuration involving a real-world view of the object 301, it can be appreciated that a rendering of the object 301 can be displayed on the hardware display surface 118 of the third device 108C.

In this illustrative example, the first user 101A is sharing content data 117 with the audience. The content data 117 is communicated between the devices 108A-108E and displayed on a hardware display surface 118 of each device 108A-108E to assist the first user 101A in the presentation to the audience. In the present example, the content data 117 is a slide deck comprising images and text. Also, in the present example, the content data 117 also has a number of sections, e.g., slides, individually related to various topics.

Figure 4B:
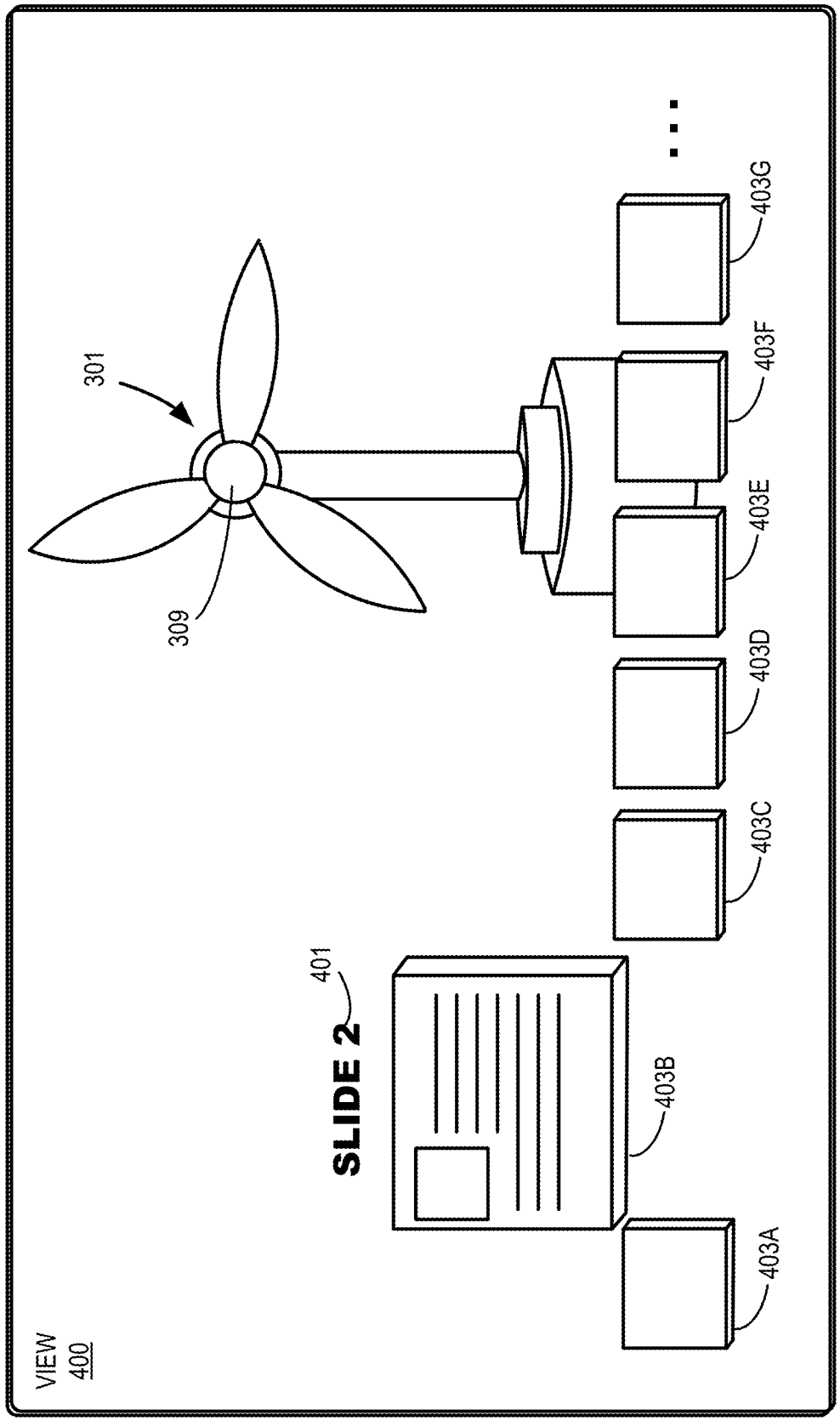

FIG. 4B illustrates an example view 400 including a rendering of the content data 117, which is presented to the third user 101C utilizing the hardware display surface 118 of the third device 108C. As shown, the view 400 includes a rendering of the content data 117 presented with a real-world view of the object 301. In this example, a rendering of the content data 117 includes a number of graphical elements 403A-403G individually representing sections, e.g., slides, of the content data 117. The example view 400 of FIG. 4B illustrates a scenario where the presenter is displaying the second section 403B, "Slide 2," to the audience. As is also shown in FIG. 4B, the graphical elements 403A-403G are positioned such that they do not block the real-world view of the object 301. In addition, other data, such as the text "SLIDE 2" describing the content data 117, is rendered in a graphical element 401 in the view 400.

Figure 4C:
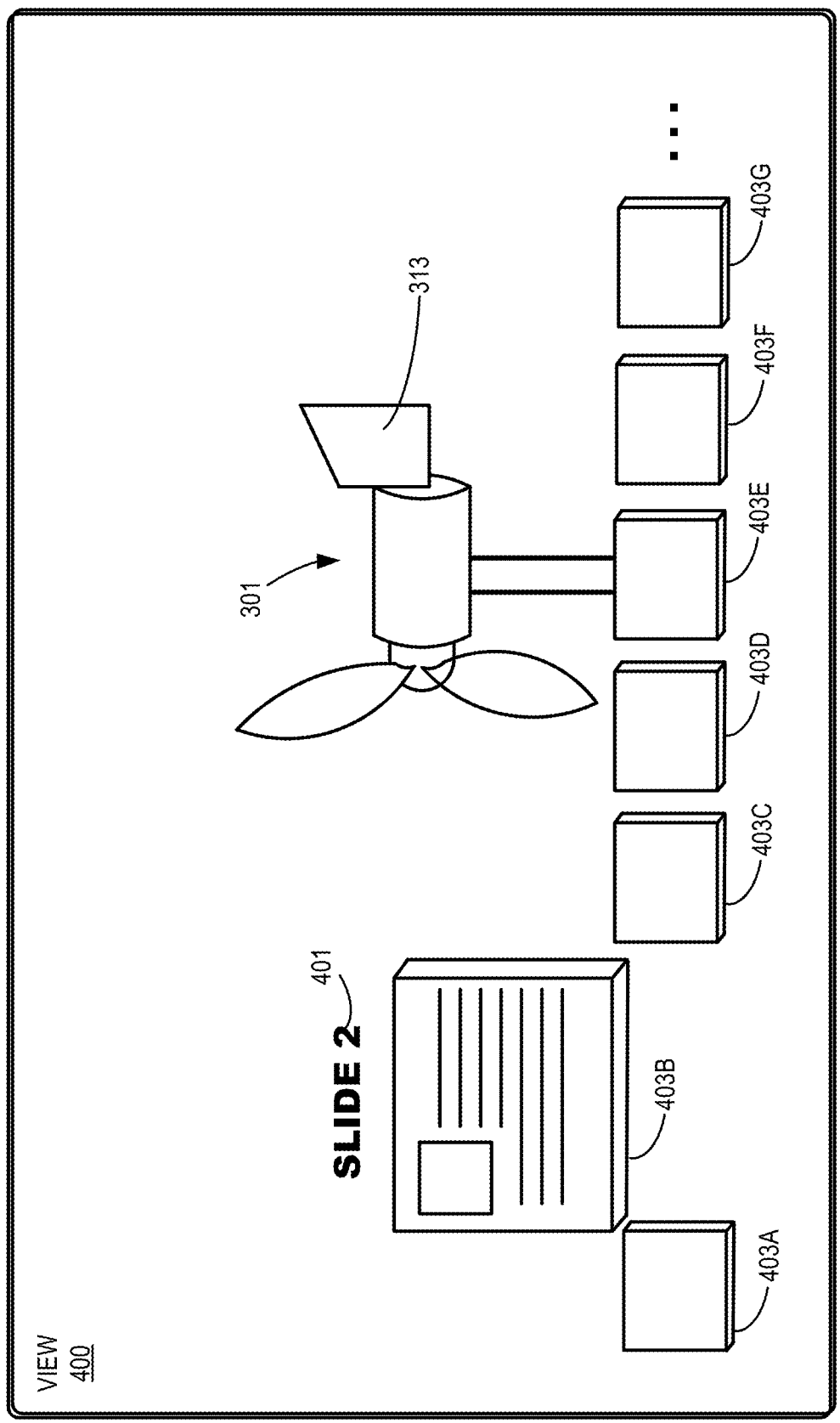

As summarized above and described in more detail below, techniques disclosed herein allow a device 108 to determine if a user is looking at a particular object, part of an object, or a section of the hardware display surface. To illustrate aspects of how such techniques can be applied to the current example, it is a given that the third user 101C is looking at the nosecone 309 of the wind turbine. When such a scenario is detected, the third device 108C can communicate contextual data 115 to the first device 108A indicating that the nosecone 309 is a gaze target. Also, as shown in FIG. 4C, in the current example, it is a given that the fifth user 101E is looking at the tail fin 313 of the wind turbine. When such a scenario is detected, the fifth device 108E can communicate contextual data 115 to the first device 108A indicating that the tail fin 313 is a gaze target.

In addition, as part of the current example, it is a given that the second user 101B of the second device 108B, the third user 101C of the third device 108C, and the fourth user 101D of the fourth device 108D have all communicated instant messages that include keywords related to the nosecone 309. When such a scenario is detected, one or more devices 108 can communicate contextual data 115 to the first device 108A indicating one or more topics of interest related to the nosecone 309.

In response to receiving the contextual data 115, the first device 108A can select one or more sections of content data 117 based, at least in part, on the received contextual data 115. For instance, the first device 108A can select slides that have content describing topics related to the gaze targets. In addition, the first device 108A can select slides that have content related to the topics of interest indicated in the communication data, e.g., the instant messages. In this example, it is a given that slide seven and slide eighty respectively include content related to the nosecone 309 and the tail fin 313. Such sections can be selected by the use of any number of suitable technologies for comparing and selecting sections of content based on the contextual data 115.

Once one or more sections have been selected, the techniques disclosed herein can generate a recommendation to the presenter indicating that members of the audience are interested in the selected sections of the content data 117. In some configurations, the recommendation may be displayed to the presenter. Alternatively, or in addition to the display of the recommendation, the recommendation can be communicated to the presenter using other mediums. For example, techniques disclosed herein may generate an audio signal, which may include a computer-generated voice, indicating aspects of the recommendation. Any form of communication, including an email, instant message, or other text-based or imaged-based communication can be utilized to provide a recommendation to the presenter or any other user.

In response to receiving the recommendation, the presenter, another user, or a device can approve or reject the recommendation. If the recommendation is approved, the selected sections can be displayed on one or more devices, allowing the presenter and the audience to view the contents of the selected sections. Alternatively, the selected sections can be automatically displayed to one or more devices without the approval.

Figure 5A:
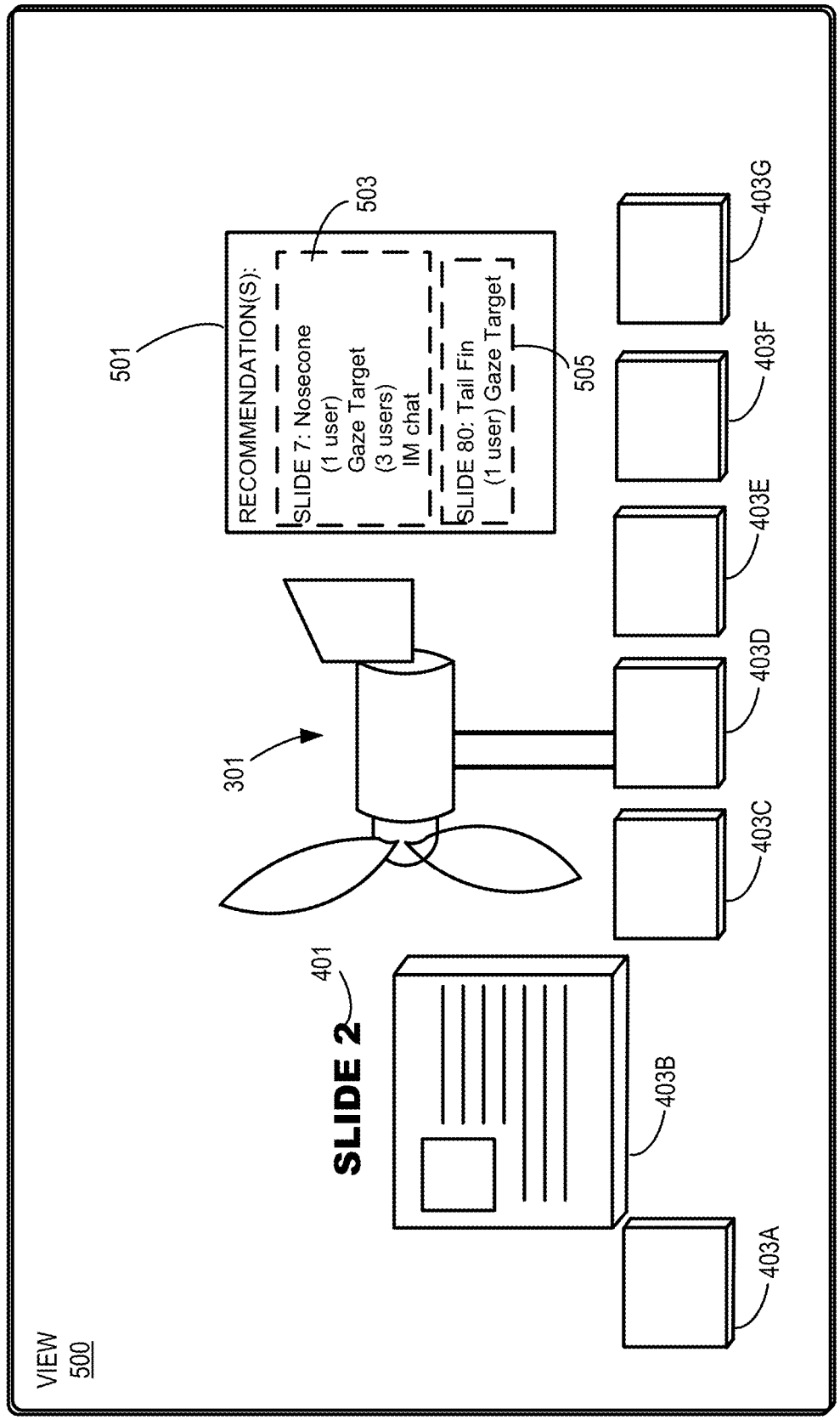
FIGS. 5A-5B illustrate several example views that are displayed to the presenter in response to the processing of contextual data obtained from the devices associated with audience members and other resources.

FIG. 5A illustrates one example view 500 of a recommendation that can be displayed to a user, such as the presenter. In this example, the view 500 includes a graphical element 501 indicating the recommendations. The graphical element 501 includes a first selectable section 503 recommending slide seven and a second selectable section 505 recommending slide eighty. Each selectable section may include a description of the selected sections and aspects of the contextual data 115. For instance, the example shown in FIG. 5A each selectable section describes the slides, e.g., slide seven and slide eighty, along with a description of the user activity associated with the selected sections.

In some configurations, the selected sections of content data 117 can be ranked based, at least in part, on the contextual data 115. The ranking or priority of the selected sections may be based on a number of factors. For instance, the ranking of the selected sections may be based on the number of users involved in the user activity, the type of activity that the users are engaged with, and/or other factors. In the present example, since four users were involved in the activity regarding the nosecone 309, the associated section, slide seven, is ranked first. Since only one user was involved in the activity regarding the tail fin 313, the associated section, slide eighty, is ranked second.

Figure 5B:
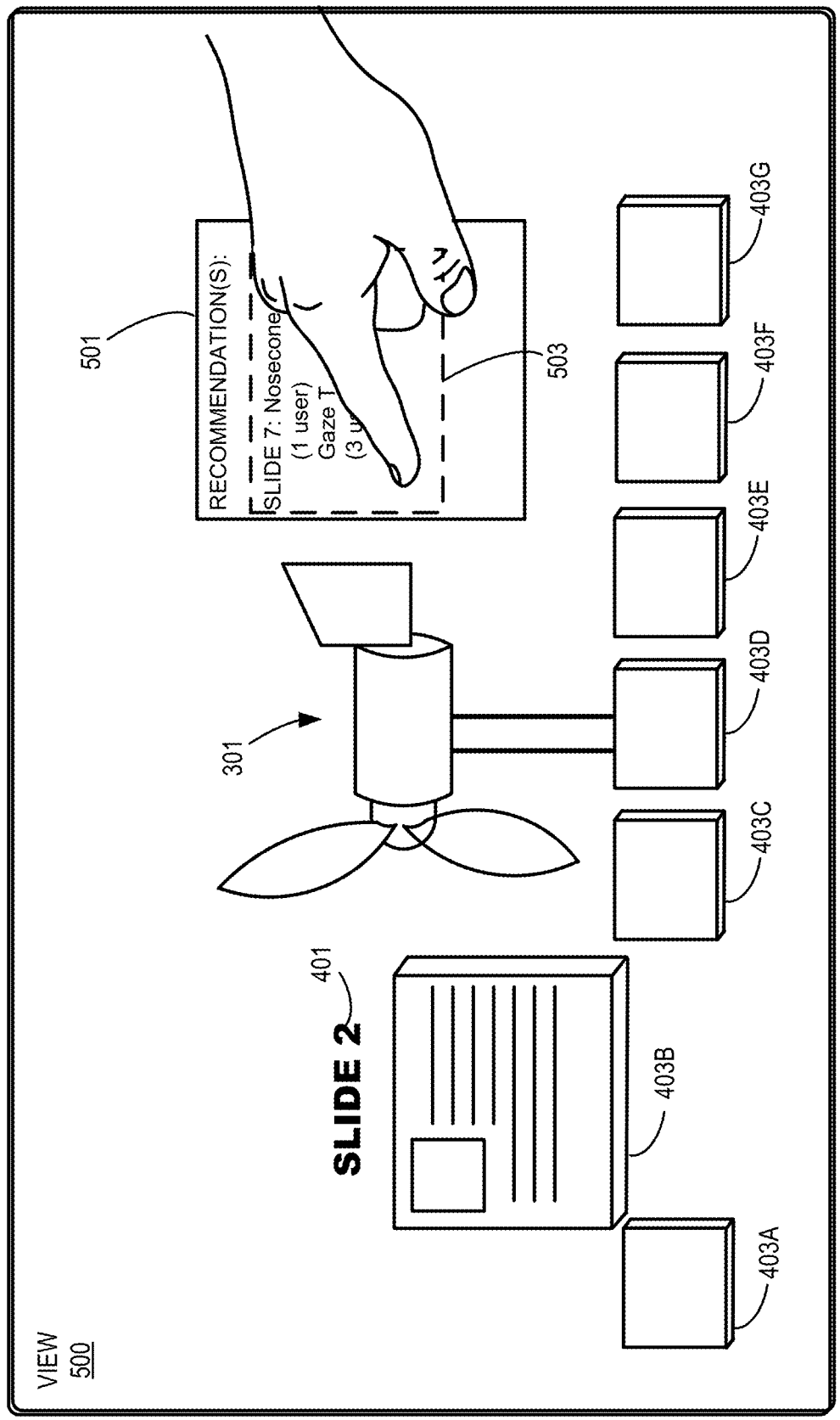

FIG. 5B illustrates one example where the presenter uses a hand gesture to select one of the recommendations. In this example, a camera of the presenter's device captures the hand movement of the presenter. The illustration of FIG. 5B shows a real-world view of the presenter's hand in relation to the graphical elements (501 and 503). As shown, by the use of one or more technologies for interpreting a gesture, the presenter has selected the first recommendation indicating that the presenter is interested in advancing to slide seven. This example is provided for illustrative purposes and is not to be construed as limiting. Any number of methods of input, e.g., a voice command or a keyboard command, can be used to determine if the presenter or a user has selected one or more recommendations. In addition, instead of communicating a recommendation to a user, such as the presenter, the identified sections may be automatically displayed to one or more devices without the need for the presenter or other user to view and select the recommendations.

Figure 6A:
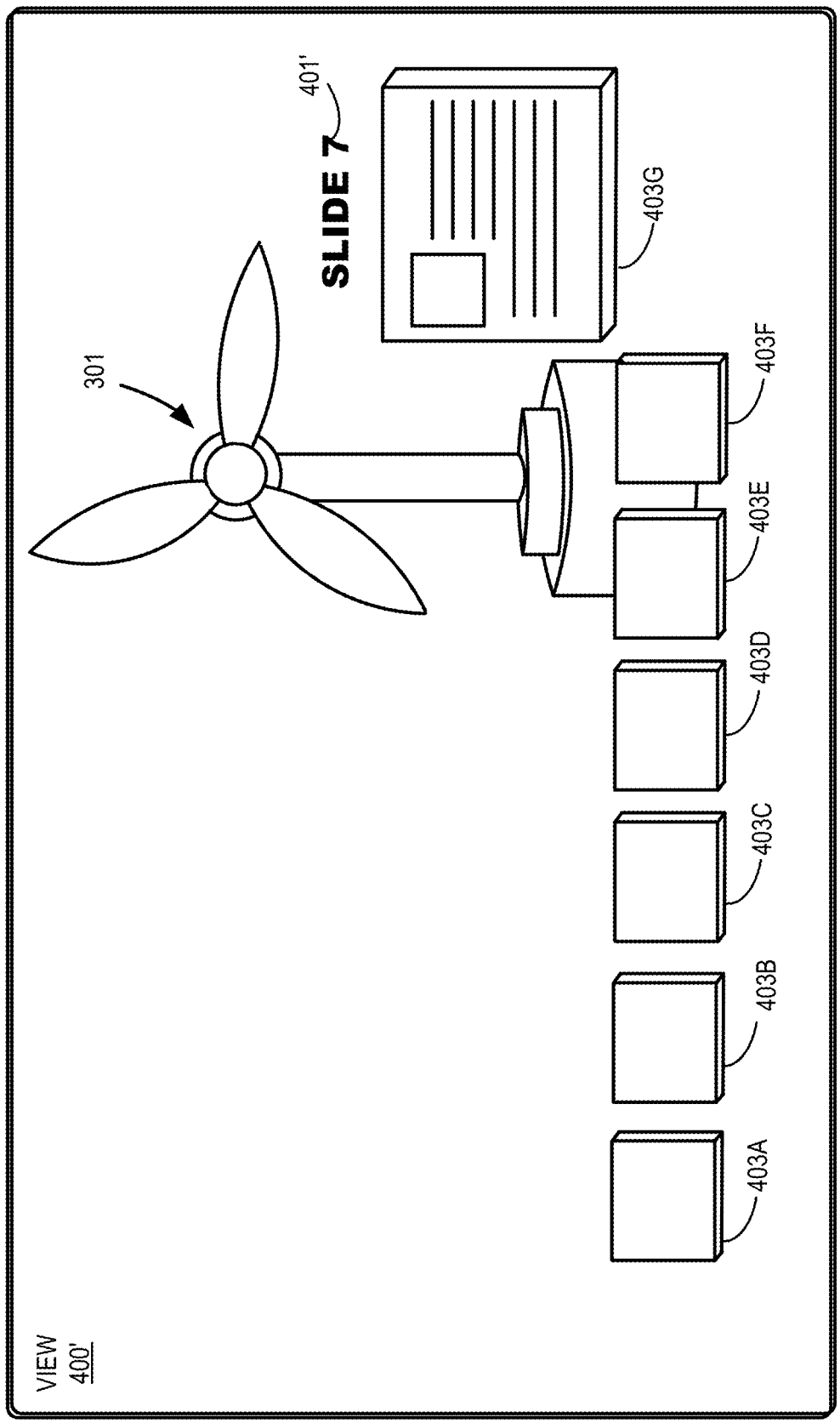
FIGS. 6A-6B illustrate example views that are displayed to audience members.

FIG. 6A illustrates an example view 400' that may be displayed on one or more devices 108 to present one or more selected sections of the content data 117. In the current example, a graphical element 403G representing the selected section, e.g., slide seven, is displayed on one or more devices 108. The graphical element 403G representing the selected section can be displayed to devices of the audience in response to a user input accepting the recommendation or the selected section can be automatically displayed on one or more devices. As shown, the graphical element 403G representing the selected section can be displayed with a real-world view of the object 301. The graphical element 403G can be configured to illustrate an association between the contents of the selected section and the object 301. Such an association can be shown by the arrangement, location, size, shape or other characteristic of the graphical element 403G.

In some configurations, a view, such as the example view 400', can include a rendering of a graphical element 401' displaying data related to the content data 117. In this example, the text "SLIDE 7" describing the content data 117, is rendered in a graphical element 401' of the view 400. The graphical element 401' can be configured to illustrate an association between the contextual data and the object 301. Such an association can be shown by the arrangement, location, size, shape or other characteristic of the graphical element 401'.

In addition to selecting and displaying sections of content data 117, the techniques disclosed herein can also utilize the contextual data 115 to obtain supplemental information. For instance, if the contextual data 115 indicates an interest in a particular topic, supplemental information can be retrieved from one or more resources, such as a search engine, data store, or other resource. For example, data defining a topic of interest can include a keyword "nosecone," and such data can be used to retrieve data from any resource such as, text and image data, from a search engine or website, such as WIKIPEDIA.

Figure 6B:
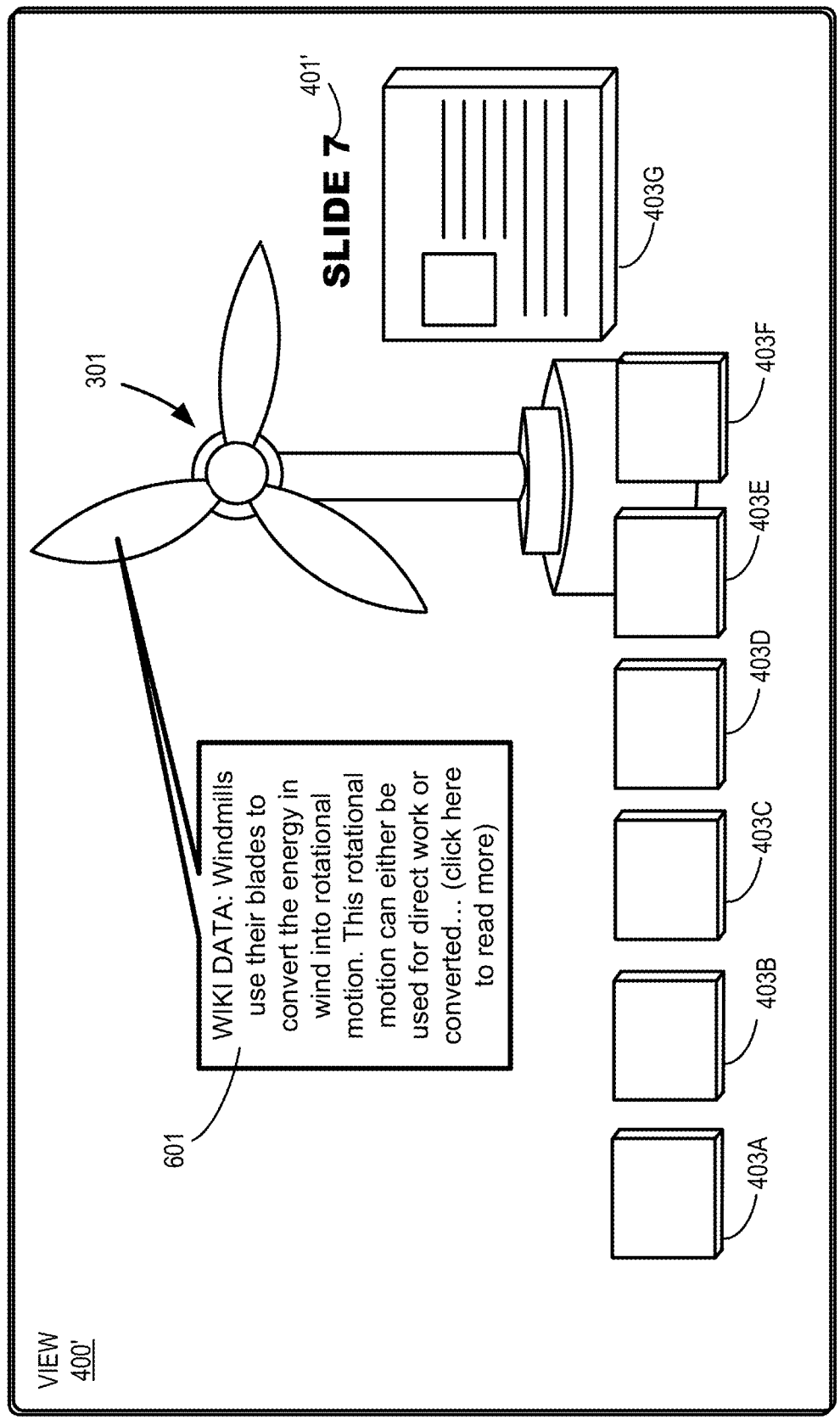

FIG. 6B illustrates one example view 400' that includes supplemental information that can be displayed to the users of the audience. In this example, it is a given that contextual data 115 received from one or more devices indicates that one or more users have an interest in the blades 311. Based on such contextual data 115, a Web search is performed and the results of the Web search are displayed, at least in part, in a graphical element 601.

In some configurations, the display of the supplemental information can be arranged to show an association with one or more objects, such as the object 301. As shown in FIG. 6B, the graphical element 601 includes lines attached to a text box to associate the supplemental information with the object 301. Such an arrangement enables the users to readily make an association between displayed information and an object, even if an image of the object 301 is rendered on a hardware display surface 118 or even if the object 301 is viewed through the hardware display surface 118. The supplemental information can be displayed in addition to the selected sections of the content data 117 or the supplemental information can be displayed independently.

In addition to the techniques described above, the techniques disclosed herein can also collect various forms of data over time for machine learning purposes. For example, if the presenter has a particular presentation that they repeat at different times, questions from the audience, gestures received from the audience, and other contextual data 115 can be used to build a database for the purposes of improving the accuracy of the recommendations as the presenter presents the subject. In some configurations, the techniques disclosed herein can also modify content data 117 based on such collected information.

Various machine learning technologies can be utilized to determine topics a group of users is most interested in. The term "machine learning" may refer to one or more programs that learns from the data it receives. For example, a machine learning mechanism may build, modify or otherwise utilize a data model that is created from example inputs and makes predictions or decisions using the data model. In the current example, the machine learning mechanism may be used to improve the identification of topics and/or sections of content data 117. The data model can be trained using supervised and/or unsupervised learning. For instance, over time as the machine learning mechanism receives more data, the attributes or other content may change based on actual data that is received.

Different machine learning mechanisms can be utilized. For example, a linear regression mechanism may be to generate a score based on the contextual data 115. Linear regression may refer to a process for modeling the relationship between one variable, such as a purchase history data point, with one or more other variables, such as a game status data point. Different linear regression models might be used to calculate the score. For example, a least squares approach might be utilized, a maximum-likelihood estimation might be utilized, or another approach might be utilized.

Figure 7:
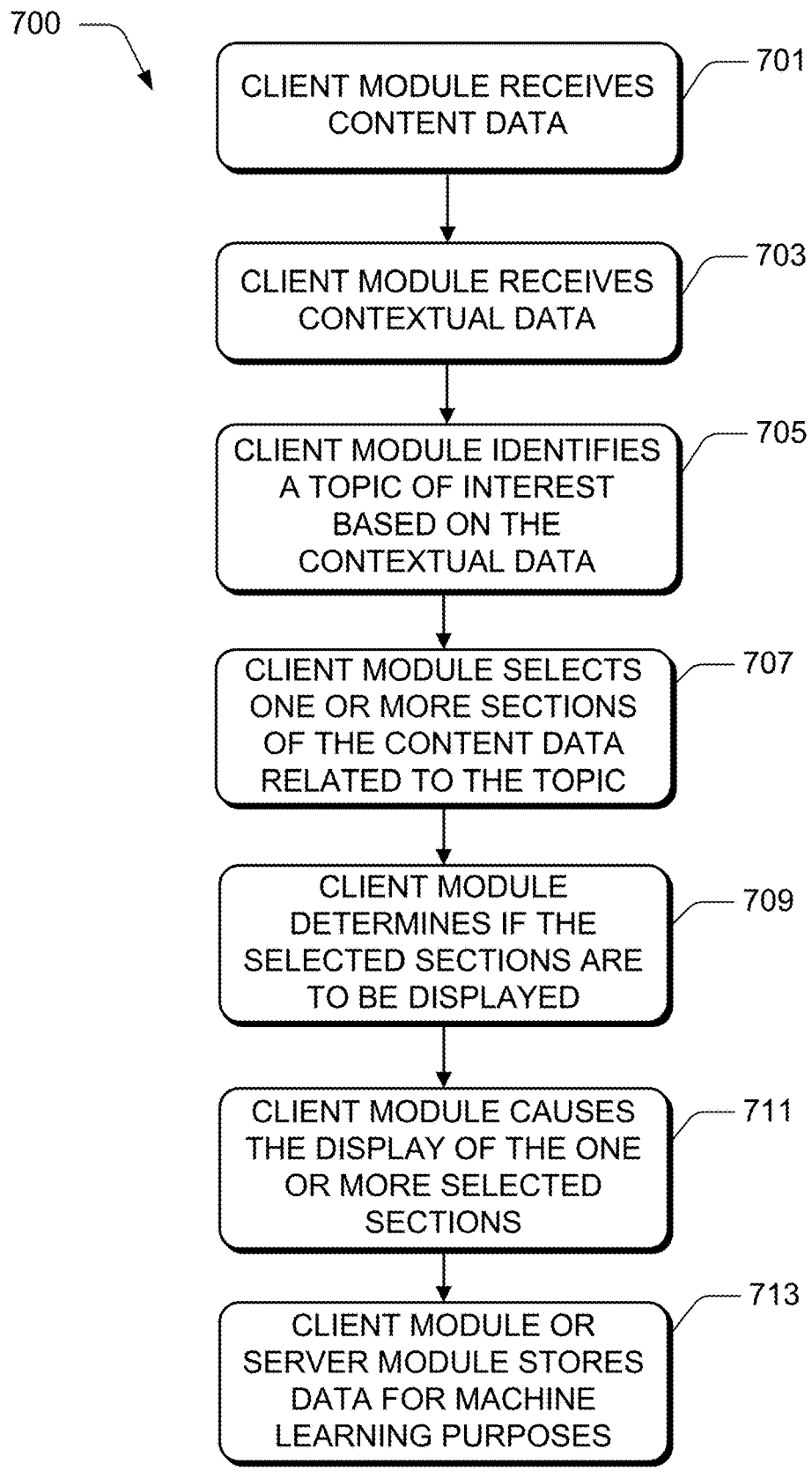
FIG. 7 is flow a diagram illustrating a routine that may be used for providing context-aware recommendations of relevant presentation content displayed in mixed environments.

Turning now to FIG. 7, aspects of a routine 700 for providing context-aware recommendations of relevant presentation content displayed in mixed environments are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit, such as the client module 111 and/or the server module 107. In some configurations, the client module 111 and/or the server module 107 can be a dynamically linked library (DLL), a statically linked library, functionality produced by an application programming interface (API), a compiled program, an interpreted program, a script or any other executable set of instructions. Data, such as the contextual data 115 and content data 117, received by the client module 111 and/or the server module 107 can be stored in a data structure in one or more memory components. Data can be retrieved from the data structure by addressing links or references to the data structure.

Although the following illustration refers to the components of FIG. 1 and FIG. 2, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. Any service, circuit or application suitable for providing contextual data indicating the position or state of any device may be used in operations described herein.

With reference to FIG. 7, the routine 700 begins at operation 701, where the client module 111 of one or more computing devices 108 receives content data 117. The content data 117 can be received from any resource and the content data 117 can be in any suitable format. The content data 117 can be stored in a data structure in memory or any computer readable storage medium for access at a later time. In one example, the content data 117 may include one or more files such as a word processing file, a slide deck, a spreadsheet file, a markup language document, etc. The content data 117 can include one or more sections, and individual sections can include content describing one or more topics. For example, a section can be a page, group of pages, a single slide, group of slides, a chapter, or any other grouping or collection of data.

Next, at operation 703, the client module 111 of one or more computing devices 108 can receive contextual data 115. As described above, the contextual data 115 can originate from a number of sources and the contextual data 115 can include any type of information that can be used to identify a topic of interest or any data that can be used to select a section of content data 117. For example, the contextual data 115 can include input data from a user. Various forms of input may include, but are not limited to, a voice command, gesture, or a status of a user or device. The contextual data 115 can also include data indicating or describing communication between various users, data used for queries for data, data provided by a search engine, data originating from a social network, etc. The contextual data 115 can also include data describing a gaze direction or a gaze target. The contextual data 115 can be stored in a data structure in memory or any computer readable storage medium for access at a later time.

Next, at operation 705, the client module 111 of one or more computing devices 108 can analyze the contextual data 115 to identify a topic of interest, which for illustrative purposes is also referred to herein as a "identified topic." In some configurations, the contextual data 115 can be used to identify a topic of interest associated with the particular object or a particular part of an object. For instance, if contextual data indicates that a user or a group of users is looking at an object, the techniques disclosed herein may identify a topic related to the object. In some configurations, if contextual data indicates that a user is looking at a particular section of a document, one or more devices can interpret the contents of the particular section to determine a topic of interest. As also summarized above, contextual data 115 characterizing or describing communication data, such as emails, instant messages, comments on a social media platform, can be interpreted to determine a topic of interest. These examples are provided for illustrative purposes and are not to be construed as limiting. It can be appreciated that any type of contextual data 115 and other data can be used to identify a topic of interest.

Next, at operation 707, the client module 111 of one or more computing devices 108 can select one or more sections of the content data 117 based, at least in part, on one or more identified topics. In some configurations, the selection of at least one section can be based on an analysis of the content data 117. For example, the techniques disclosed herein may select one or more sections having content describing one or more topics related to the topic(s) identified in operation 705. Any number of technologies for identifying relationships between the identified topic and the sections of the content data 117 can be utilized. It can also be appreciated that one or more sections of the content data 117 can be selected based on an analysis of the contextual data 115. In such configurations, one or more suitable technologies for identifying similarities between the contextual data 115 and the contents of each section of the content data 117 can be utilized to select one or more sections of content data 117.

Next, at operation 709, the client module 111 of one or more computing devices 108 can determine if the selected sections of the content data 117 are to be displayed. In some configurations, the one or more selected sections of the content data 117 can be displayed based on one or more factors. For example, a presenter may receive a notification describing the selected sections. In response to the notification, the presenter may approve or reject the selected sections. In some configurations, the selected sections can be associated with a value indicating a level of relevancy of the sections. The one or more selected sections can be automatically approved and displayed if the level of relevancy meets a threshold level. In some configurations, the selected sections of the content data 117 can be automatically displayed to one or more devices based on one or more factors, such as a ranking of sections.

Next, at operation 711, the client module 111 of one or more computing devices 108 can cause the display of graphical data configured to display the selected sections. The devices displaying the selected sections can include, for example, computing devices of an audience. In addition to the display of the selected sections, the one or more computing devices 108 can also display supplemental information. Examples showing the display of selected sections and supplemental information are shown in FIG. 6A and FIG. 6B.

Next, at operation 713, the client module 111 and/or the server module 107 of one or more computing devices 108 and/or servers 110 can store contextual data 115, data defining the selected sections, and other data for machine learning purposes. As summarized above, various machine learning technologies can be utilized to determine which objects or topics a group of users is most interested in. As the system 100 accumulates contextual data 115 and other data, the techniques disclosed herein improve the accuracy of the recommendations. For instance, the technologies used for identifying a topic of interest can improve as the data store of such information accumulates. In addition, by use of various machine learning technologies, the techniques used for identifying selected sections can improve over time.

In some configurations, the techniques disclosed herein can monitor the audience reaction to the recommendations and/or selected sections. For example, if users appear to be engaged with the recommended sections, one or more values may be generated indicating a performance metric associated with the recommendation. A device, for example, can generate data indicating a performance metric based on contextual data 115 that indicates members of an audience have a more concentrated gaze direction, more focused communication regarding the recommended sections, or other like behavior. Future recommendations can be influenced, at least in part, by the one or more values indicating the performance metric.

Figure 8A:
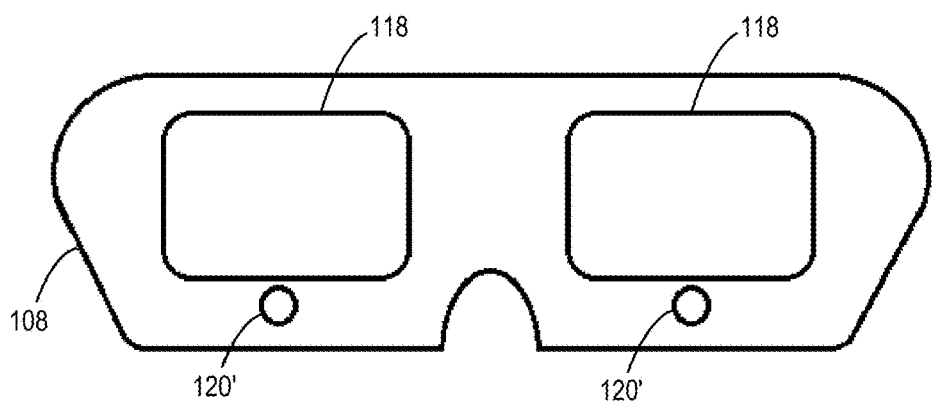
FIGS. 8A-8C illustrate aspects of a device having sensors for tracking the movement of at least one eye of a user.
Figure 8B:
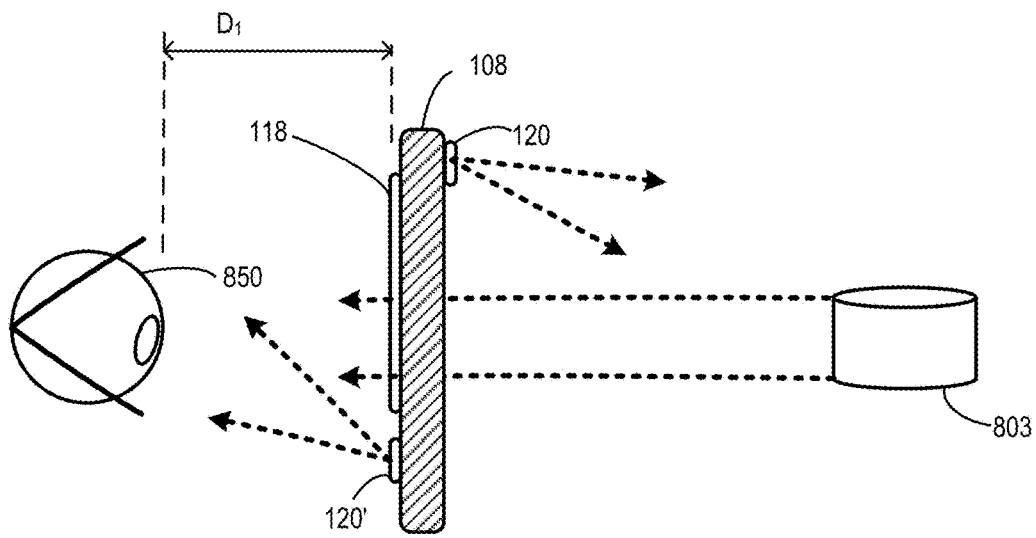
Figure 8C:
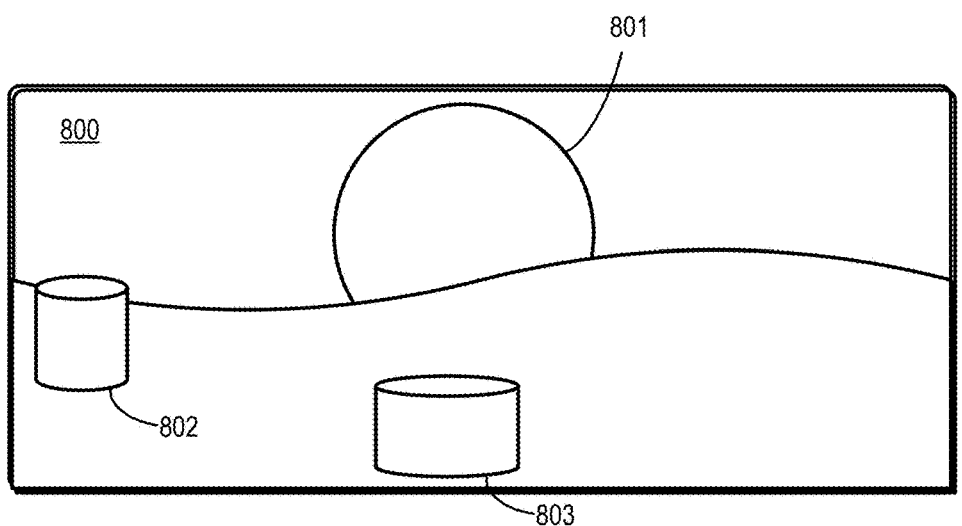

Referring now to FIG. 8A through FIG. 8C, the following section describes techniques for identifying a gaze target. To facilitate such functionality, in some configurations, one or more sensors 120' can be configured to track the position of at least one eye of a user. In addition, at least one other sensor 120 can be directed toward a real-world object 803 for generating image data of the real-world object. As will be described in more detail below, configurations can process eye position data, image data, and other data to identify a gaze target that is a rendered object displayed on a hardware display surface 118 or a real-world object 803 viewed through a transparent section of the hardware display surface 118. As will also be described below, configurations disclosed herein can also determine if the user is looking at a particular section of a hardware display surface 118, a particular part of a real-world object, or a particular part of a rendered object.

In this illustrative example, the device 108 comprises two sensors 120' for generating data or a signal indicating the position or movement of at least one eye 850 of a user. The sensors 120' may be in the form of a camera or another suitable device for tracking the position or movement of at least one eye 850 of a user. The device 108 also comprises at least one hardware display surface 118 for allowing a user to view one or more objects. As summarized herein, the hardware display surface 118 can provide a view of a real-world object through the hardware display surface 118 as well as images of rendered objects that can be displayed on the hardware display surface 118.

FIG. 8B is a side cutaway view of the device 108 shown in FIG. 8A. The hardware display surface 118 is configured to create transparent sections enabling a user to view objects through the hardware display surface 118. In addition, the hardware display surface 118 can display one or more rendered objects. The device 108 also comprises at least one sensor 120' directed toward at least one eye 850 of the user. This illustration shows an example arrangement where a real-world object 803 is aligned with a transparent section of the hardware display surface 118 allowing the user to view the real-world object 803 through the hardware display surface 118.

FIG. 8C illustrates one example view 800 that may be observed by a user via the hardware display surface 118. In this illustrative example, the view 800 comprises a first rendered object 801 and a second rendered object 802 that are displayed on the hardware display surface 118. The real-world object 803 is viewed through the hardware display surface 118.

To facilitate aspects of such a configuration, the device 108 can utilize one or more techniques for calibrating the device 108. The following section, in conjunction with FIG. 9A through FIG. 9F, describes aspects of a technique for obtaining calibration data. A subsequent section, in conjunction with FIG. 10A through FIG. 10F, describes aspects of an example scenario where a device 108 processes the calibration data and other data to identify a gaze target.

A device 108 can be calibrated in a number of ways. In one example, a device 108 can utilize the display of a number of graphical elements at predetermined locations. As the graphical elements are displayed, the device 108 can prompt the user to look at a particular graphical element and provide an input to verify that the user is looking at the particular graphical element. When the user verifies that he or she is looking at the particular graphical element one or more sensors 120' can generate eye position data defining a position of at least one eye. The eye position data can be stored in a data structure in memory in response to receiving the verification from the user.

Figure 9A:
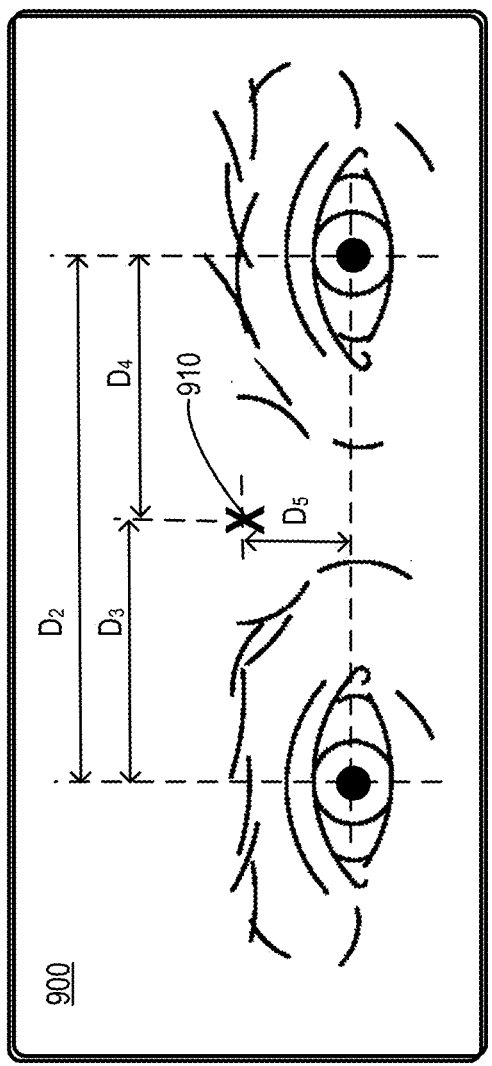

FIG. 9A illustrates one example view 900 that can be captured by the sensors 120' of the device 108. From such a perspective, the device 108 can determine one or more values that define the position of at least one eye 850 of the user. In one illustrative example, the values can include a second value ($D_2$) indicating a distance between a user's eyes and a third value ($D_3$), fourth value ($D_4$), and a fifth value ($D_5$) indicating a distance between at least one eye of the user and a reference point 910. It can be appreciated that by the use of one or more image processing technologies, one or more aspects of an eye, such as the pupil, can be identified and utilized to determine an eye position.

In addition, by the use of one or more suitable technologies, a reference point 910 can be selected. A reference point 910 can be based on a feature of the user, e.g., a tip of a nose, an eyebrow, a beauty mark, or a reference point 910 can be in an arbitrary location. In the example of FIG. 9A, a point between the user's eyes is used as a reference point 910. This example reference point 910 is provided for illustrative purposes and is not to be construed as limiting. It can be appreciated that the reference point 910 is can be in any suitable location, which may be based on an identifiable feature or characteristic of a user or any object.

Figure 9B:
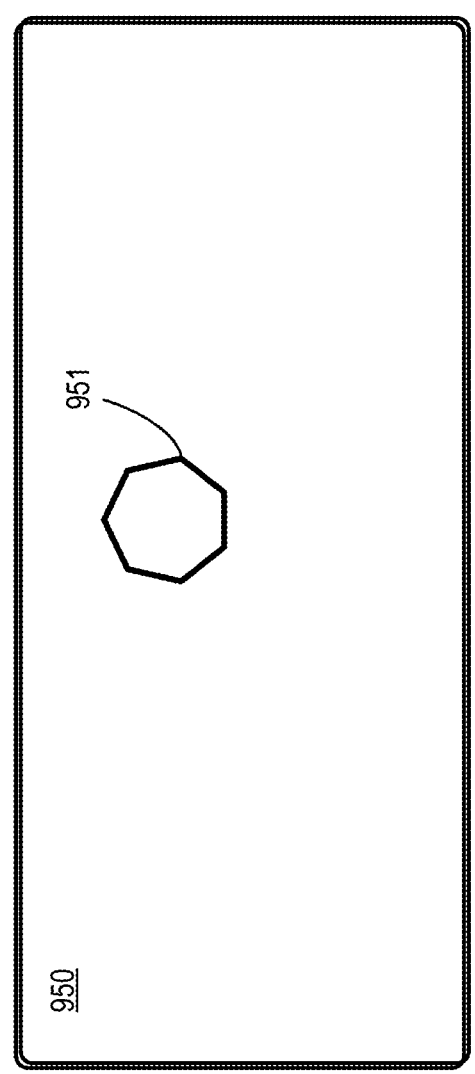

As described above, a device 108 can generate a number of graphical elements at predetermined locations of the hardware display surface 118. As the graphical elements are displayed on the hardware display surface 118, the device 108 can prompt the user to look at the graphical elements and provide an input to verify that the user is looking at the graphical elements. FIG. 9B illustrates one example view 950 of a graphical element 951 that can be generated by the device 108 to facilitate the calibration process. In this example, the device 108 generates a rendering of a graphical element 951 in the center of the viewing area. While the graphical element 951 is displayed, the device 108 can generate a prompt for the user to verify that he or she is looking at the graphical element 951. The prompt, as well as a user response to the prompt, can include a gesture, voice command, or other suitable types of input.

When the device 108 verifies that the user is looking at the graphical element 951, the device may record one or more values indicating the position and/or the movement of at least one eye 850 of the user. For instance, one or more values described above and shown in FIG. 9A and FIG. 8B can be stored in a data structure in memory. It can be appreciated that any suitable value or a combination of values can be stored and utilized, including but not limited to: the first value ($D_1$) indicating the distance between the sensors 120 and at least one eye 850 of a user, the second value ($D_2$) indicating the distance between the eyes of a user, and other values ($D_3$, $D_4$, and $D_5$) indicating the distance between at least one eye 850 and a reference point 910. These values are provided for illustrative purposes and are not to be construed as limiting. It can be appreciated that such values, subsets of such values, and other values of other measurements can be utilized in determining the movement and/or the position of one or more eyes 850 of a user.

Other sets of values can be measured during the display of other graphical elements displayed in various positions. For example, as shown in FIG. 9C, a second set of values ($D_2'$, $D_3'$, $D_4'$, and $D_5'$) can be measured when a second graphical element 952 is displayed, as shown in FIG. 9D. As shown in FIG. 9E, a third set of values ($D_2''$, $D_3''$, $D_4''$, and $D_5''$) can be measured when a third graphical element 953 is displayed, as shown in FIG. 9F.

These example measurements and the locations of the graphical elements are provided for illustrative purposes. It can be appreciated that any number of graphical elements can be placed at different locations to obtain measurements that may be used to calibrate a device 108. For example, the device 108 can sequentially display a graphical element at pre-determined locations of the view 950, such as each corner of the view 950. As can be appreciated, more or fewer graphical elements may be used in the calibration process.

The values that indicate the position of at least one eye 850 at each pre-determined location can be used to generate calibration data. The calibration data can be configured to correlate the sets of eye position data with data identifying the positions of the graphical elements.

Any known technique suitable for generating calibration data can be used. It can be appreciated that the generation of calibration data may include extrapolation, projection and/or estimation technologies that may project correlations between sets of eye position data and various sections of a hardware display surface 118 and/or pixels of a hardware display surface 118. These examples are provided for illustrative purposes and are not to be construed as limiting, it can be appreciated that the values and/or calibration data can be obtained in other ways, including receiving such calibration data from one or more remote resources.

Once the calibration data is generated or obtained, such data and other data can be utilized by the device 108 to determine if a user is looking at a particular gaze target, which can include a part of a hardware display surface 118, a rendered object, part of a rendered object, a real-world object, or part of a real-world object. FIG. 10A through FIG. 10F describes aspects of an example scenario where the device 108 having at least one sensor 120' is used to track the movement of at least one eye 850 of a user to identify a gaze target.

Figure 10A:
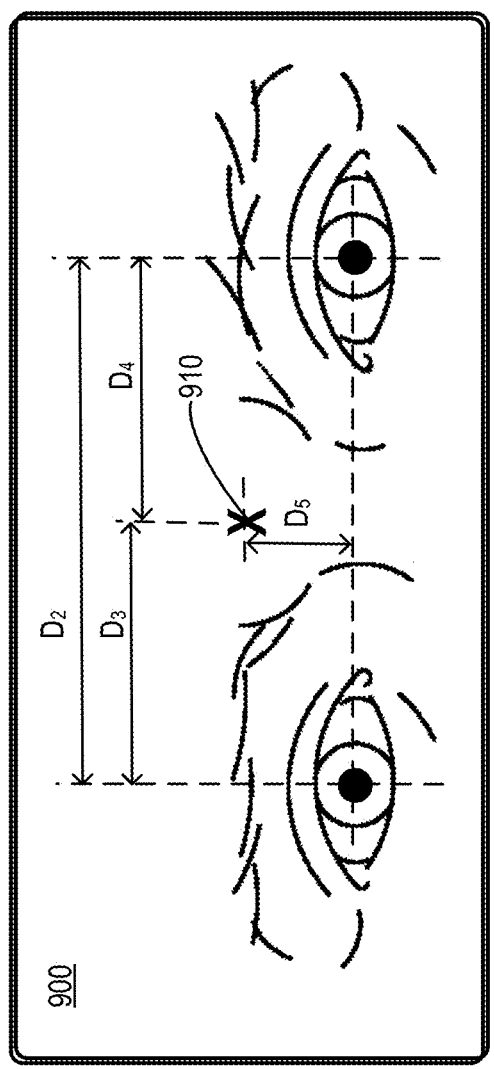
FIGS. 10A-10F illustrate several example scenarios where a device is used for tracking the movement of at least one eye of a user to identify a gaze target that is rendered on a hardware display surface or viewed through the hardware display surface.
Figure 10B:
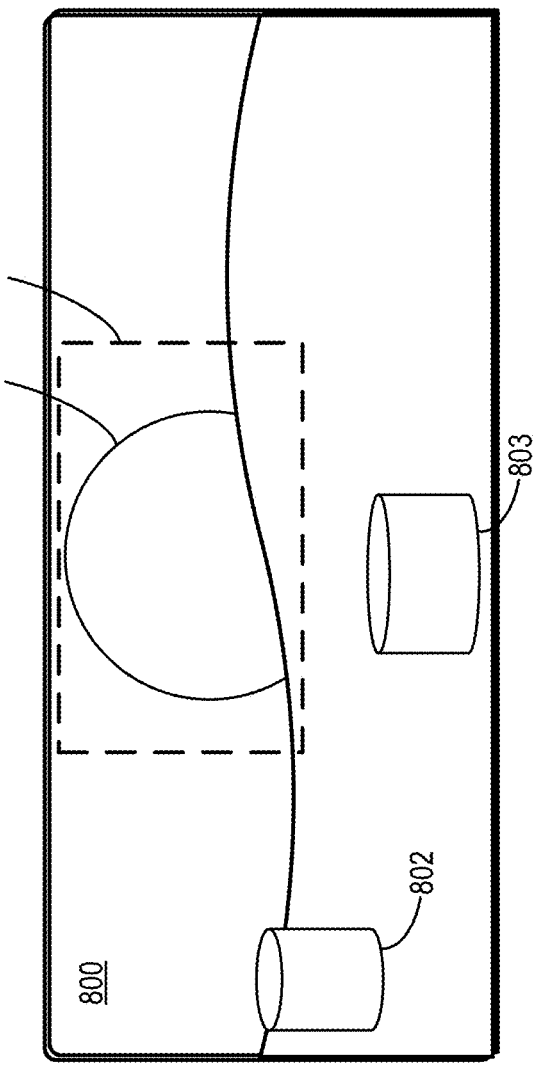

Referring now to FIG. 10A and FIG. 10B, an example scenario showing the identification of a gaze target is shown and described. In this example, the user is looking at the example view 800. As summarized above, the example view 800 comprises both a view of rendered objects on the hardware display surface 118 as well as a view of a real-world object 803 through the hardware display surface 118. While the user is looking at the view 800, the one or more sensors 120' can cause the generation of one or more measured values, such as the values shown in the FIG. 10A. In some configurations, using any combination of suitable technologies, such values can be compared against the calibration data and/or other data to identify a gaze target. In this example, one or more values measured in the scenario depicted in FIG. 10A can be processed with the calibration data to determine that the user is looking at the first object 801. In such an example, the one or more measured values shown in FIG. 10A can also be used to determine that the user is looking at a predetermined section of an interface, such as the first section 1004 of the hardware display surface 118.

Figure 10C:
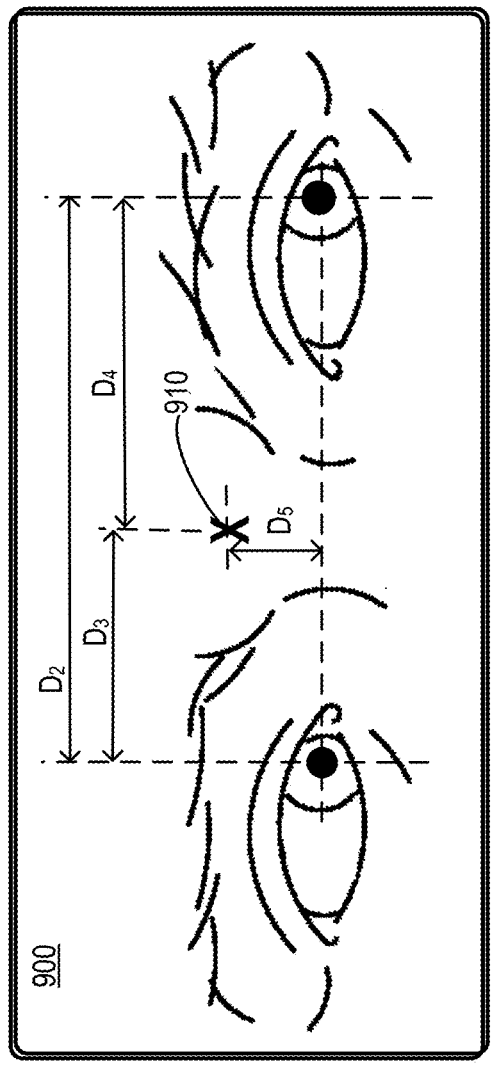
Figure 10D:
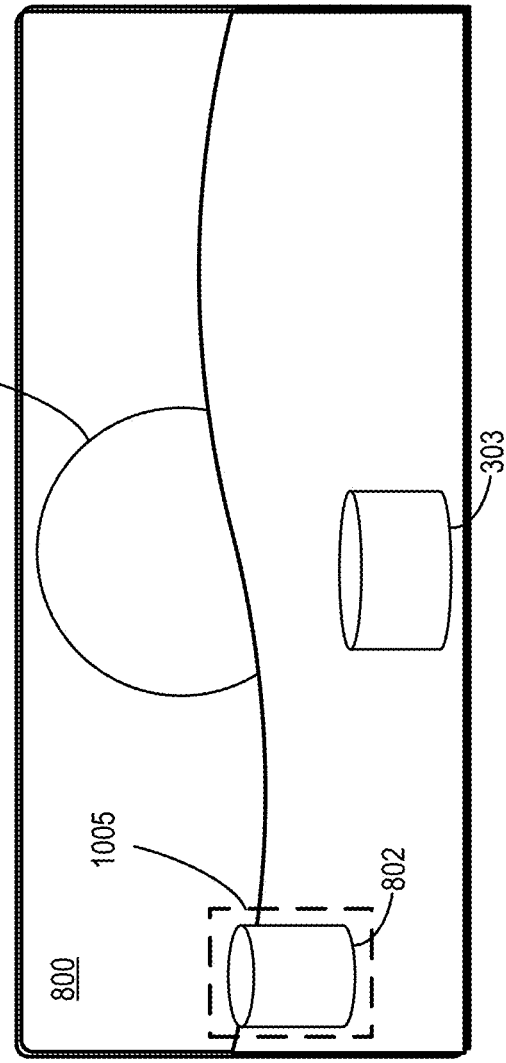

In continuing the present example, one or more values measured in the scenario depicted in FIG. 10C can be processed with the calibration data to determine that the user is looking at the second rendered object 802. In such an example, the one or more measured values shown in FIG. 10C can also be used to determine that the user is looking at a second section 1005 of the hardware display surface 118.

Figure 10E:
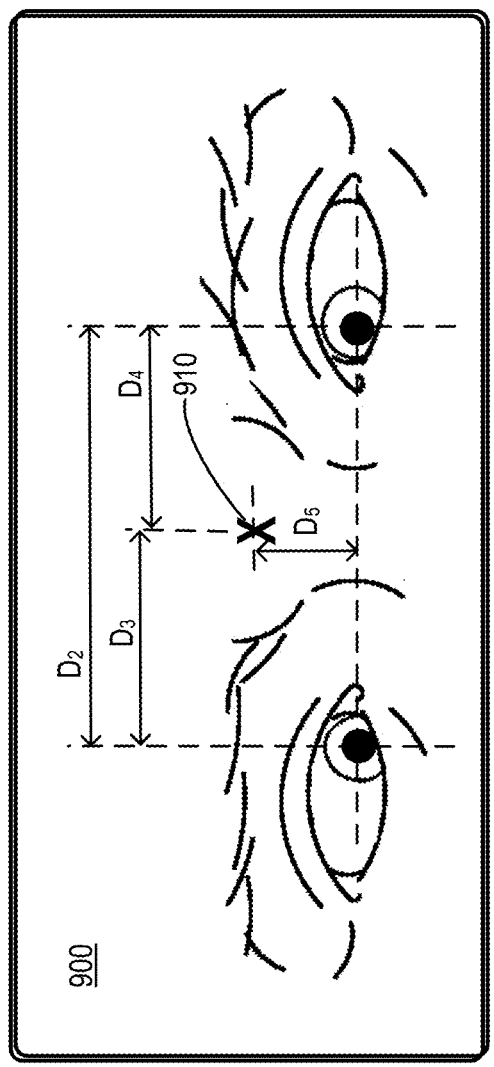
Figure 10F:
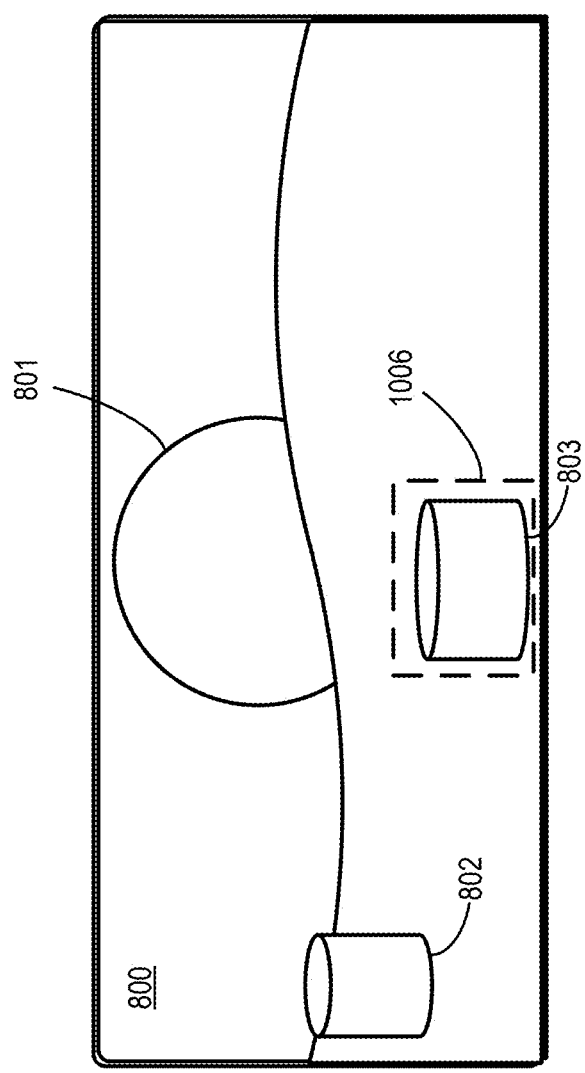

For illustrative purposes, the one or more values measured in the scenario depicted in FIG. 10E can be processed with the calibration data to determine that the user is looking at a third section 1006 of the hardware display surface 118. One or more values measured in the scenario depicted in FIG. 10E can also be used to determine that the user is looking at the real-world view of the third object 803 through the hardware display surface 118.

In some configurations, the device 108 can utilize data from a combination of resources to determine if a user is looking at a real-world view of the third object 803 through the hardware display surface 118. As summarized above, a camera or other type of sensor 120 (FIG. 8A) mounted to the device 108 can be directed towards a user's field of view. Image data generated from the camera can be analyzed to determine if an object in the field of view is in a pre-determined position of an image of the image data. If an object is positioned within a pre-determined area of an image, such as the center of the image, a device can determine a gaze target processing such data with eye position data. Such data may be utilized to supplement other types of data, such as position data from a GPS and/or data generated from a compass or accelerometer, to enable a device 108 to determine a gaze direction, e.g., left, right, up, or down, and/or a gaze target.

Figure 11:
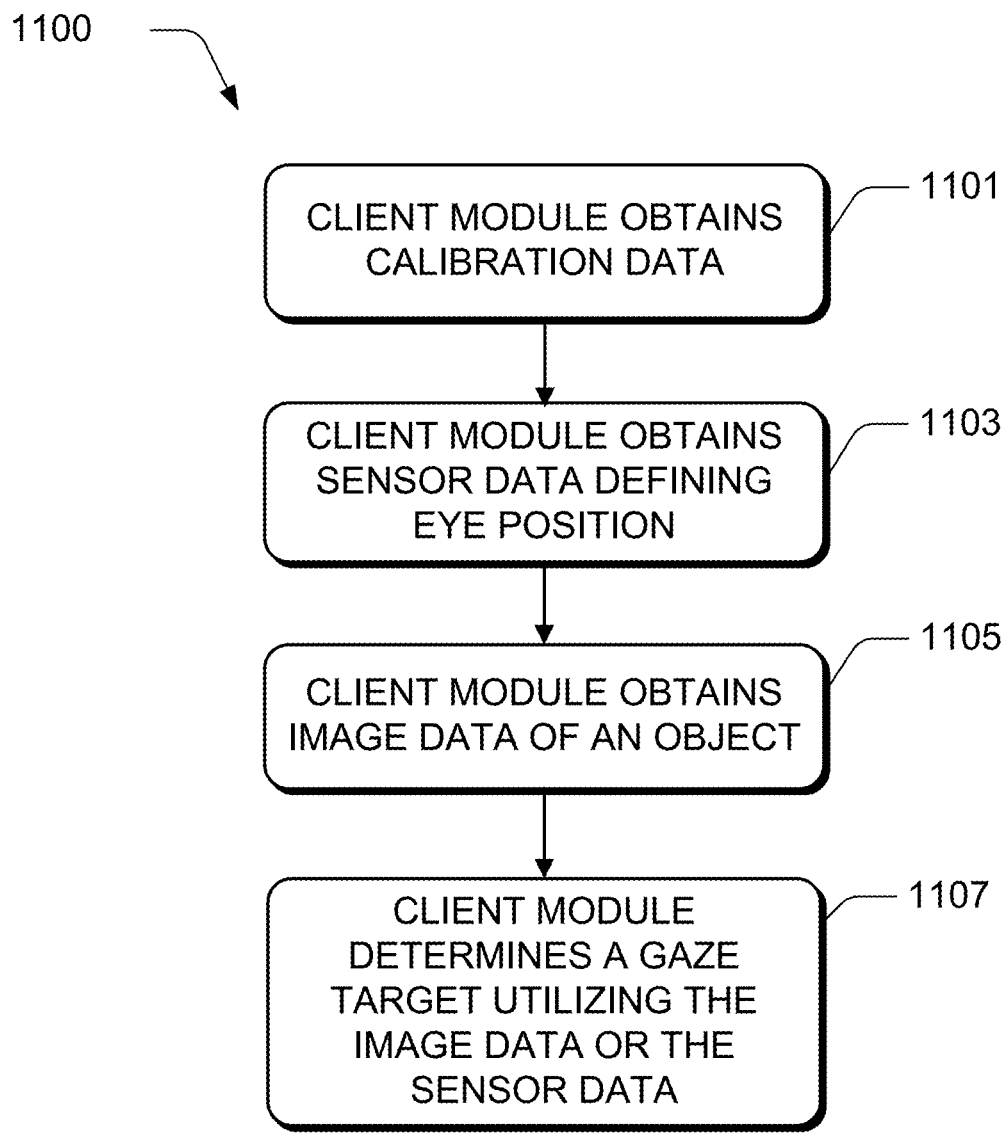
FIG. 11 is flow a diagram illustrating a routine that may be used for identifying a gaze target that is rendered on a hardware display surface or viewed through the hardware display surface.

Turning now to FIG. 11, aspects of an example routine 1100 for determining a gaze target is shown and described below. The routine 1100 begins at operation 1101, where the client module 111 of one or more computing devices 108 obtains calibration data. The calibration data can be stored in a data structure in memory or any computer readable storage medium for access at a later time. The calibration data can be generated by the device 108 or the calibration data can be received from a remote resource. In some configurations, sensors 120' of a device 108 can be positioned to track the position of at least one eye of a user. The sensors 120' can cause the generation of one or more values that correlate the position of at least one eye of a user with a particular section or position of a hardware display surface 118. Such configurations can utilize an initialization process where the device 108 displays one or more graphical elements at pre-determined locations. During the display of the one or more graphical elements, one or more inputs from a user can indicate that they are looking at the one or more graphical elements. In response to the input, a device can generate calibration data comprising the values that correlate the position of at least one eye of a user with data identifying a particular position or section of a hardware display surface 118.

Next, at operation 1103, during operation of the device 108, the client module 111 of one or more computing devices 108 obtains sensor data indicating the position of at least one eye of the user. The sensor data can be stored in a data structure in memory or any computer readable storage medium for access at a later time. As summarized above, one or more sensors 120' directed toward at least one eye of the user can cause the generation of sensor data indicating the position of at least one eye of the user. The sensor data can be processed to generate data indicating a gaze direction of a user. As will be described below, the data indicating the gaze direction of the user can be processed with the calibration data to determine if the user is looking at a gaze target, which can include a rendered object displayed on the hardware display surface.

Next, at operation 1105, the client module 111 of one or more computing devices 108 obtains image data of an object. The image data of the object can be stored in a data structure in memory or any computer readable storage medium for access at a later time. In some configurations, a camera or other type of sensor 120 mounted to a device 108 can be directed towards a user's field of view. The camera or other type of sensor 120 can cause the generation of image data, which can include one or more images of an object that is in the user's field of view. The image data can be in any suitable format and generated by any suitable sensor 120, which may include the use of a depth map sensor, camera, etc.

Next, at operation 1107, the client module 111 of one or more computing devices 108 can determine a gaze target utilizing the image data or the sensor data. For instance, if a user is looking at a real-world view of the object through the hardware display surface 118, and a sensor 120 directed towards the user's field of view generates image data of the object, the image data can be analyzed to determine if the object in the field of view is in a pre-determined position of an image of the image data. For example, if an object is positioned within a pre-determined area of an image, such as the center of the image, a device can determine that the object is a gaze target.

In another aspect of operation 1107, sensor data indicating the position of at least one eye of the user can be processed with the calibration data and/or image data to determine if the user is looking at a rendered object displayed on the hardware display surface 118. Such a configuration can be used to determine that the rendered object displayed on the hardware display surface 118 is a gaze target.

Figure 12:
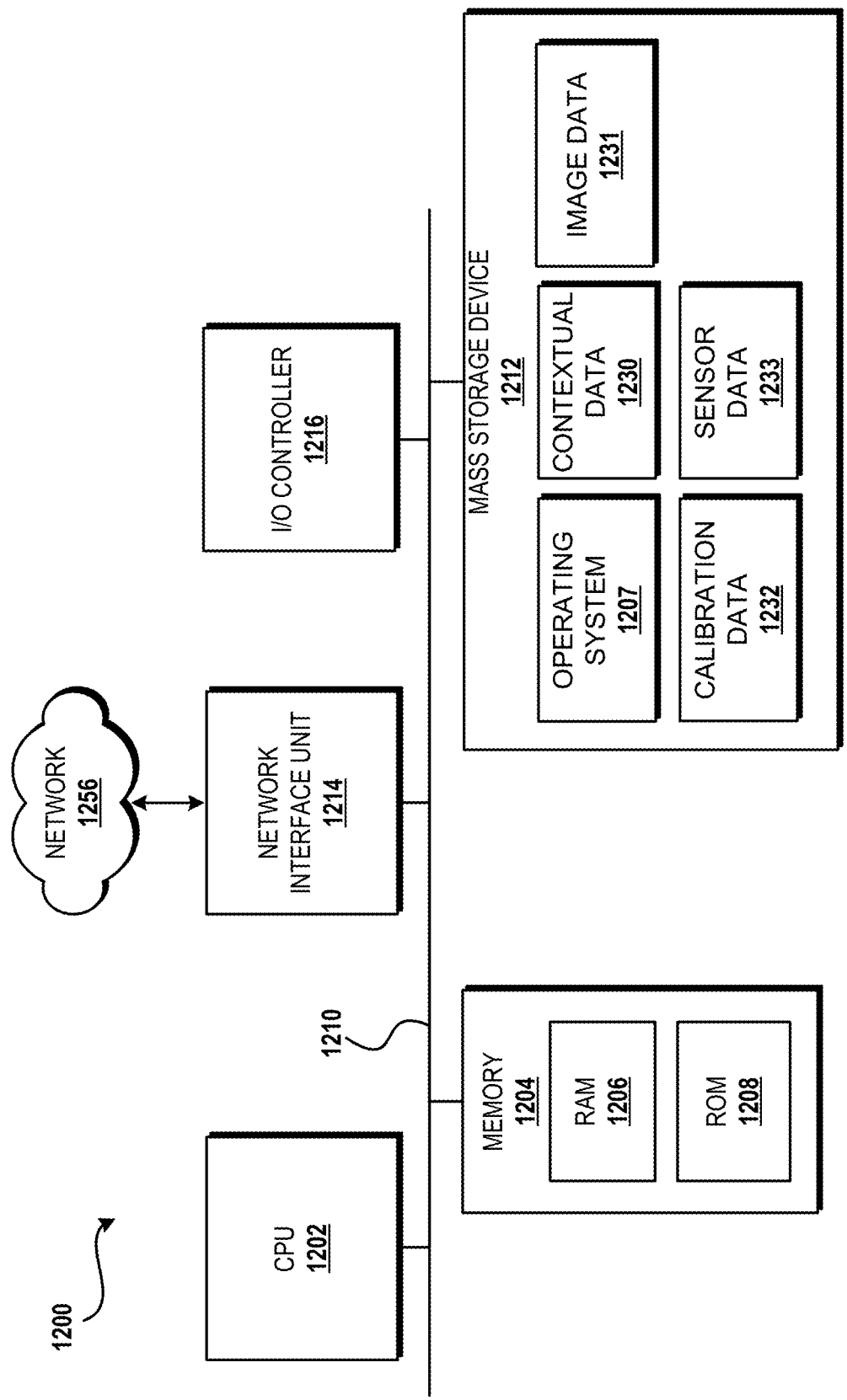
FIG. 12 is a computer architecture diagram illustrating an illustrative computer hardware and software architecture for a computing system capable of implementing aspects of the techniques and technologies presented herein.

FIG. 12 shows additional details of an example computer architecture 1200 for a computer, such as the computing devices 108 shown in FIG. 1 and FIG. 2, capable of executing the program components described above for providing context-aware recommendations of relevant presentation content displayed in mixed environments. Thus, the computer architecture 1200 illustrated in FIG. 12 illustrates an architecture for a server computer, mobile phone, a PDA, a smart phone, a desktop computer, a netbook computer, a tablet computer, and/or a laptop computer. The computer architecture 1200 may be utilized to execute any aspects of the software components presented herein.

The computer architecture 1200 illustrated in FIG. 12 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system containing the basic routines that help to transfer information between elements within the computer architecture 1200, such as during startup, is stored in the ROM 1208. The computer architecture 1200 further includes a mass storage device 1212 for storing an operating system 1207, and one or more application programs including, but not limited to, a tracking module 105 and contextual data 1230, image data 1231, calibration data 1232, and sensor data 1233.

The mass storage device 1212 is connected to the CPU 1202 through a mass storage controller (not shown) connected to the bus 1210. The mass storage device 1212 and its associated computer-readable media provide non-volatile storage for the computer architecture 1200. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes the claims, the phrase "computer storage medium," "computer-readable storage medium" and variations thereof, does not include waves, signals, and/or other transitory and/or intangible communication media, per se.

According to various configurations, the computer architecture 1200 may operate in a networked environment using logical connections to remote computers through the network 1256 and/or another network (not shown). The computer architecture 1200 may connect to the network 1256 through a network interface unit 1214 connected to the bus 1210. It should be appreciated that the network interface unit 1214 also may be utilized to connect to other types of networks and remote computer systems. The computer architecture 1200 also may include an input/output controller 1216 for receiving and processing input from a number of other devices, including a keyboard, mouse, or electronic stylus (not shown in FIG. 12). Similarly, the input/output controller 1216 may provide output to a display screen, a printer, or other type of output device (also not shown in FIG. 12).

It should be appreciated that the software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 may include other types of computing devices, including hand-held computers, embedded computer systems, personal digital assistants, and other types of computing devices known to those skilled in the art. It is also contemplated that the computer architecture 1200 may not include all of the components shown in FIG. 12, may include other components that are not explicitly shown in FIG. 12, or may utilize an architecture completely different than that shown in FIG. 12.

Figure 13:
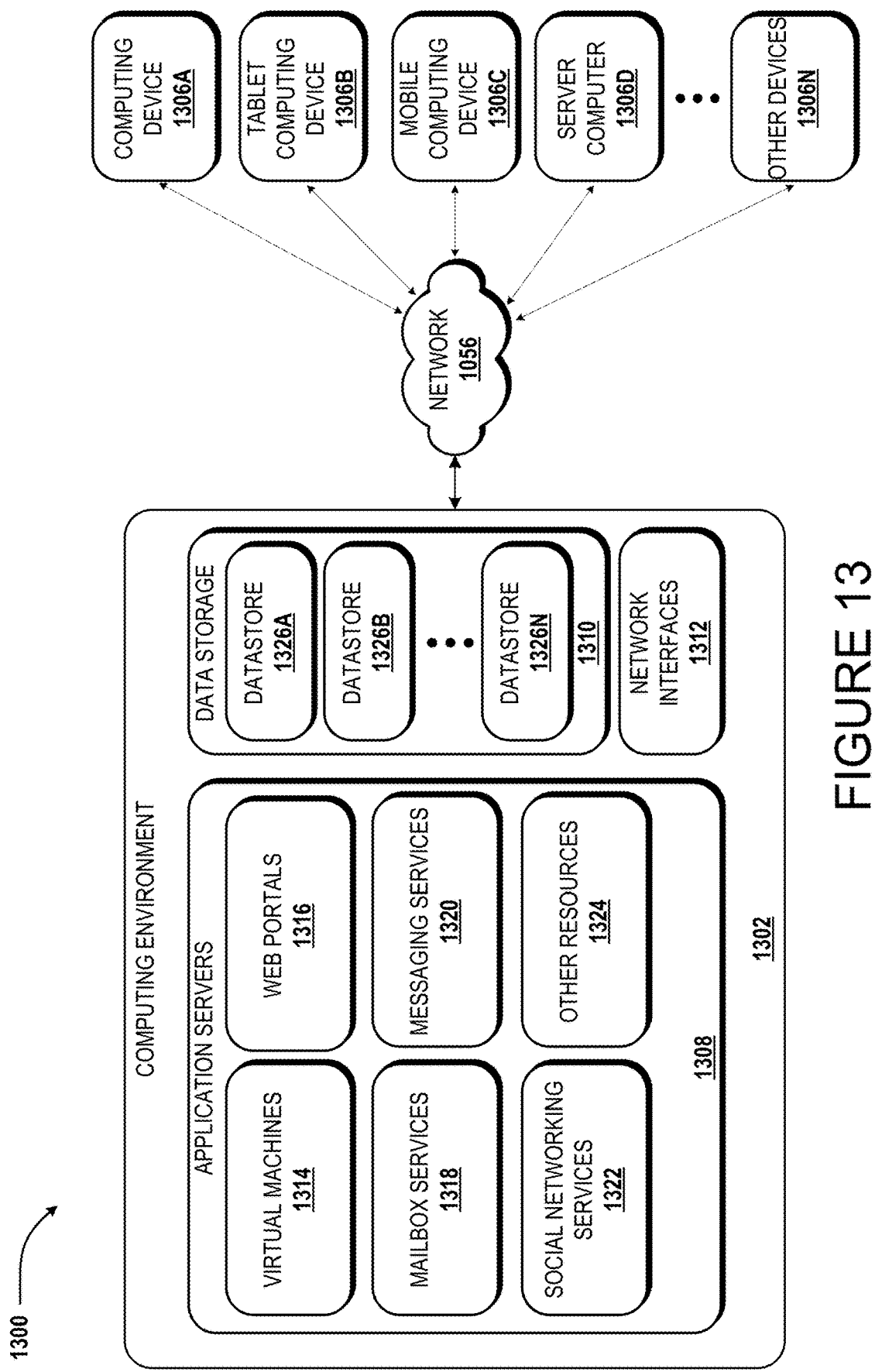
FIG. 13 is a diagram illustrating a distributed computing environment capable of implementing aspects of the techniques and technologies presented herein.

FIG. 13 depicts an illustrative distributed computing environment 1300 capable of executing the software components described herein for providing context-aware recommendations of relevant presentation content displayed in mixed environments, among other aspects. Thus, the distributed computing environment 1300 illustrated in FIG. 13 can be utilized to execute any aspects of the software components presented herein. For example, the distributed computing environment 1300 can be utilized to execute aspects of the techniques disclosed herein.

According to various implementations, the distributed computing environment 1300 includes a computing environment 1302 operating on, in communication with, or as part of the network 1304. The network 1304 may be or may include the network 1056, described above with reference to FIG. 7 and FIG. 11. The network 1304 also can include various access networks. One or more client devices 1306A-1306N (hereinafter referred to collectively and/or generically as "clients 1306") can communicate with the computing environment 1302 via the network 1304 and/or other connections (not illustrated in FIG. 13). In one illustrated configuration, the clients 1306 include a computing device 1306A such as a laptop computer, a desktop computer, or other computing device; a slate or tablet computing device ("tablet computing device") 1306B; a mobile computing device 1306C such as a mobile telephone, a smart phone, or other mobile computing device; a server computer 1306D; and/or other devices 1306N. It should be understood that any number of clients 1306 can communicate with the computing environment 1302. It should be understood that the illustrated clients 1306 and computing architectures illustrated and described herein are illustrative, and should not be construed as being limited in any way.

In the illustrated configuration, the computing environment 1302 includes application servers 1308, data storage 1310, and one or more network interfaces 1312. According to various implementations, the functionality of the application servers 1308 can be provided by one or more server computers that are executing as part of, or in communication with, the network 1304. The application servers 1308 can host various services, virtual machines, portals, and/or other resources. In the illustrated configuration, the application servers 1308 host one or more virtual machines 1314 for hosting applications or other functionality. According to various implementations, the virtual machines 1314 host one or more applications and/or software modules for providing context-aware recommendations of relevant presentation content displayed in mixed environments. It should be understood that this configuration is illustrative, and should not be construed as being limiting in any way. The application servers 1308 also host or provide access to one or more portals, link pages, Websites, and/or other information ("Web portals") 1316.

According to various implementations, the application servers 1308 also include one or more mailbox services 1318 and one or more messaging services 1320. The mailbox services 1318 can include electronic mail ("email") services. The mailbox services 1318 also can include various personal information management ("PEM") services including, but not limited to, calendar services, contact management services, collaboration services, and/or other services. The messaging services 1320 can include, but are not limited to, instant messaging services, chat services, forum services, and/or other communication services.

The application servers 1308 also may include one or more social networking services 1322. The social networking services 1322 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1322 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1322 are provided by other services, sites, and/or providers that may or may not be explicitly known as social networking providers. For example, some Websites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1322 also can include commenting, blogging, and/or micro blogging services. Examples of such services include, but are not limited to, the YELP commenting service, the KUDZU review service, the OFFICETALK enterprise micro blogging service, the TWITTER messaging service, the GOGGLE BUZZ service, and/or other services. It should be appreciated that the above lists of services are not exhaustive and that numerous additional and/or alternative social networking services 1322 are not mentioned herein for the sake of brevity. As such, the above configurations are illustrative, and should not be construed as being limited in any way. According to various implementations, the social networking services 1322 may host one or more applications and/or software modules for providing the functionality described herein for providing context-aware recommendations of relevant presentation content displayed in mixed environments. For instance, any one of the application servers 1308 may communicate or facilitate the functionality and features described herein. For instance, a social networking application, mail client, messaging client, a browser running on a phone or any other client 1306 may communicate with a networking service 1322 and facilitate the functionality, even in part, described above with respect to FIGS. 7 and 11.

As shown in FIG. 13, the application servers 1308 also can host other services, applications, portals, and/or other resources ("other resources") 1324. The other resources 1324 can include, but are not limited to, document sharing, rendering or any other functionality. It thus can be appreciated that the computing environment 1302 can provide integration of the concepts and technologies disclosed herein provided herein with various mailbox, messaging, social networking, and/or other services or resources.

As mentioned above, the computing environment 1302 can include the data storage 1310. According to various implementations, the functionality of the data storage 1310 is provided by one or more databases operating on, or in communication with, the network 1304. The functionality of the data storage 1310 also can be provided by one or more server computers configured to host data for the computing environment 1302. The data storage 1310 can include, host, or provide one or more real or virtual data stores 1326A-1326N (hereinafter referred to collectively and/or generically as "data stores 1326"). The data stores 1326 are configured to host data used or created by the application servers 1308 and/or other data. Although not illustrated in FIG. 13, the data stores 1326 also can host or store web page documents, word processer documents, presentation documents, data structures, algorithms for execution by a recommendation engine, and/or other data utilized by any application program or another module, such as the content manager 105. Aspects of the data stores 1326 may be associated with a service for storing files.

The computing environment 1302 can communicate with, or be accessed by, the network interfaces 1312. The network interfaces 1312 can include various types of network hardware and software for supporting communications between two or more computing devices including, but not limited to, the clients 1306 and the application servers 1308. It should be appreciated that the network interfaces 1312 also may be utilized to connect to other types of networks and/or computer systems.

It should be understood that the distributed computing environment 1300 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1300 provides the software functionality described herein as a service to the clients 1306. It should be understood that the clients 1306 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1300 to utilize the functionality described herein for providing context-aware recommendations of relevant presentation content displayed in mixed environments, among other aspects. In one specific example, as summarized above, techniques described herein may be implemented, at least in part, by the operating system 1007 of FIG. 10, which works in conjunction with the application servers 1308 of FIG. 13.

Turning now to FIG. 14, an illustrative computing device architecture 1400 for a computing device that is capable of executing various software components described herein for providing context-aware recommendations of relevant presentation content displayed in mixed environments. The computing device architecture 1400 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1400 is applicable to any of the clients 1306 shown in FIG. 13. Moreover, aspects of the computing device architecture 1400 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1400 illustrated in FIG. 14 includes a processor 1402, memory components 1404, network connectivity components 1406, sensor components 1408, input/output components 1412, and power components 1412. In the illustrated configuration, the processor 1402 is in communication with the memory components 1404, the network connectivity components 1406, the sensor components 1408, the input/output ("I/O") components 1410, and the power components 1412. Although no connections are shown between the individuals components illustrated in FIG. 14, the components can interact to carry out device functions. In some configurations, the components are arranged so as to communicate via one or more busses (not shown).

The processor 1402 includes a central processing unit ("CPU") configured to process data, execute computer-executable instructions of one or more application programs, and communicate with other components of the computing device architecture 1400 in order to perform various functionality described herein. The processor 1402 may be utilized to execute aspects of the software components presented herein and, particularly, those that utilize, at least in part, a touch-enabled input.

In some configurations, the processor 1402 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1402 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1402 is, or is included in, a system-on-chip ("SoC") along with one or more of the other components described herein below. For example, the SoC may include the processor 1402, a GPU, one or more of the network connectivity components 1406, and one or more of the sensor components 1408. In some configurations, the processor 1402 is fabricated, in part, utilizing a package-on-package ("PoP") integrated circuit packaging technique. The processor 1402 may be a single core or multi-core processor.

The processor 1402 may be created in accordance with an ARM architecture, available for license from ARM HOLDINGS of Cambridge, United Kingdom. Alternatively, the processor 1402 may be created in accordance with an x86 architecture, such as is available from INTEL CORPORATION of Mountain View, Calif. and others. In some configurations, the processor 1402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1404 include a random access memory ("RAM") 1414, a read-only memory ("ROM") 1416, an integrated storage memory ("integrated storage") 1418, and a removable storage memory ("removable storage") 1420. In some configurations, the RAM 1414 or a portion thereof, the ROM 1416 or a portion thereof, and/or some combination the RAM 1414 and the ROM 1416 is integrated in the processor 1402. In some configurations, the ROM 1416 is configured to store a firmware, an operating system or a portion thereof (e.g., operating system kernel), and/or a bootloader to load an operating system kernel from the integrated storage 1418 and/or the removable storage 1420.

The integrated storage 1418 can include a solid-state memory, a hard disk, or a combination of solid-state memory and a hard disk. The integrated storage 1418 may be soldered or otherwise connected to a logic board upon which the processor 1402 and other components described herein also may be connected. As such, the integrated storage 1418 is integrated in the computing device. The integrated storage 1418 is configured to store an operating system or portions thereof, application programs, data, and other software components described herein.

The removable storage 1420 can include a solid-state memory, a hard disk, or a combination of solid-state memory and a hard disk. In some configurations, the removable storage 1420 is provided in lieu of the integrated storage 1418. In other configurations, the removable storage 1420 is provided as additional optional storage. In some configurations, the removable storage 1420 is logically combined with the integrated storage 1418 such that the total available storage is made available as a total combined storage capacity. In some configurations, the total combined capacity of the integrated storage 1418 and the removable storage 1420 is shown to a user instead of separate storage capacities for the integrated storage 1418 and the removable storage 1420.

The removable storage 1420 is configured to be inserted into a removable storage memory slot (not shown) or other mechanism by which the removable storage 1420 is inserted and secured to facilitate a connection over which the removable storage 1420 can communicate with other components of the computing device, such as the processor 1402. The removable storage 1420 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SEM ("USEM")), a proprietary format, or the like.

It can be understood that one or more of the memory components 1404 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1406 include a wireless wide area network component ("WWAN component") 1422, a wireless local area network component ("WLAN component") 1424, and a wireless personal area network component ("WPAN component") 1426. The network connectivity components 1406 facilitate communications to and from the network 1456 or another network, which may be a WWAN, a WLAN, or a WPAN. Although only the network 1456 is illustrated, the network connectivity components 1406 may facilitate simultaneous communication with multiple networks, including the network 1256 of FIG. 14. For example, the network connectivity components 1406 may facilitate simultaneous communications with multiple networks via one or more of a WWAN, a WLAN, or a WPAN.

The network 1456 may be or may include a WWAN, such as a mobile telecommunications network utilizing one or more mobile telecommunications technologies to provide voice and/or data services to a computing device utilizing the computing device architecture 1400 via the WWAN component 1422. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1456 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1456 may be configured to provide voice and/or data communications with any combination of the above technologies. The network 1456 may be configured to or adapted to provide voice and/or data communications in accordance with future generation technologies.

In some configurations, the WWAN component 1422 is configured to provide dual-multi-mode connectivity to the network 1456. For example, the WWAN component 1422 may be configured to provide connectivity to the network 1456, wherein the network 1456 provides service via GSM and UMTS technologies, or via some other combination of technologies. Alternatively, multiple WWAN components 1422 may be utilized to perform such functionality, and/or provide additional functionality to support other non-compatible technologies (i.e., incapable of being supported by a single WWAN component). The WWAN component 1422 may facilitate similar connectivity to multiple networks (e.g., a UMTS network and an LTE network).

The network 1456 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1424 is configured to connect to the network 1456 via the WI-FI access points. Such connections may be secured via various encryption technologies including, but not limited, WI-FI Protected Access ("WPA"), WPA2, Wired Equivalent Privacy ("WEP"), and the like.

The network 1456 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1426 is configured to facilitate communications with other devices, such as peripherals, computers, or other computing devices via the WPAN.

The sensor components 1408 include a magnetometer 1428, an ambient light sensor 1430, a proximity sensor 1432, an accelerometer 1434, a gyroscope 1436, and a Global Positioning System sensor ("GPS sensor") 1438. It is contemplated that other sensors, such as, but not limited to, temperature sensors or shock detection sensors, also may be incorporated in the computing device architecture 1400.

The magnetometer 1428 is configured to measure the strength and direction of a magnetic field. In some configurations the magnetometer 1428 provides measurements to a compass application program stored within one of the memory components 1404 in order to provide a user with accurate directions in a frame of reference including the cardinal directions, north, south, east, and west. Similar measurements may be provided to a navigation application program that includes a compass component. Other uses of measurements obtained by the magnetometer 1428 are contemplated.

The ambient light sensor 1430 is configured to measure ambient light. In some configurations, the ambient light sensor 1430 provides measurements to an application program stored within one of the memory components 1404 in order to automatically adjust the brightness of a display (described below) to compensate for low-light and high-light environments. Other uses of measurements obtained by the ambient light sensor 1430 are contemplated.

The proximity sensor 1432 is configured to detect the presence of an object in proximity to the computing device without direct contact. In some configurations, the proximity sensor 1432 detects the presence of a user's body (e.g., the user's face) and provides this information to an application program stored within one of the memory components 1404 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1432 are contemplated.

The accelerometer 1434 is configured to measure proper acceleration. In some configurations, output from the accelerometer 1434 is used by an application program as an input mechanism to control some functionality of the application program. For example, the application program may be a video game in which a character, a portion thereof, or an object is moved or otherwise manipulated in response to input received via the accelerometer 1434. In some configurations, output from the accelerometer 1434 is provided to an application program for use in switching between landscape and portrait modes, calculating coordinate acceleration, or detecting a fall. Other uses of the accelerometer 1434 are contemplated.

The gyroscope 1436 is configured to measure and maintain orientation. In some configurations, output from the gyroscope 1436 is used by an application program as an input mechanism to control some functionality of the application program. For example, the gyroscope 1436 can be used for accurate recognition of movement within a 3D environment of a video game application or some other application. In some configurations, an application program utilizes output from the gyroscope 1436 and the accelerometer 1434 to enhance control of some functionality of the application program. Other uses of the gyroscope 1436 are contemplated.

The GPS sensor 1438 is configured to receive signals from GPS satellites for use in calculating a location. The location calculated by the GPS sensor 1438 may be used by any application program that requires or benefits from location information. For example, the location calculated by the GPS sensor 1438 may be used with a navigation application program to provide directions from the location to a destination or directions from the destination to the location. Moreover, the GPS sensor 1438 may be used to provide location information to an external location-based service, such as E911 service. The GPS sensor 1438 may obtain location information generated via WI-FI, WIMAX, and/or cellular triangulation techniques utilizing one or more of the network connectivity components 1406 to aid the GPS sensor 1438 in obtaining a location fix. The GPS sensor 1438 may also be used in Assisted GPS ("A-GPS") systems.

The I/O components 1410 include a display 1440, a touchscreen 1442, a data I/O interface component ("data I/O") 1444, an audio I/O interface component ("audio I/O") 1446, a video I/O interface component ("video I/O") 1448, and a camera 1450. In some configurations, the display 1440 and the touchscreen 1442 are combined. In some configurations two or more of the data I/O component 1444, the audio I/O component 1446, and the video I/O component 1448 are combined. The I/O components 1410 may include discrete processors configured to support the various interface described below, or may include processing functionality built-in to the processor 1402.

The display 1440 is an output device configured to present information in a visual form. In particular, the display 1440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1440 is a liquid crystal display ("LCD") utilizing any active or passive matrix technology and any backlighting technology (if used). In some configurations, the display 1440 is an organic light emitting diode ("OLED") display. Other display types are contemplated.

The touchscreen 1442, also referred to herein as a "touch-enabled screen," is an input device configured to detect the presence and location of a touch. The touchscreen 1442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1442 is incorporated on top of the display 1440 as a transparent layer to enable a user to use one or more touches to interact with objects or other information presented on the display 1440. In other configurations, the touchscreen 1442 is a touch pad incorporated on a surface of the computing device that does not include the display 1440. For example, the computing device may have a touchscreen incorporated on top of the display 1440 and a touch pad on a surface opposite the display 1440.

In some configurations, the touchscreen 1442 is a single-touch touchscreen. In other configurations, the touchscreen 1442 is a multi-touch touchscreen. In some configurations, the touchscreen 1442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1442. As such, a developer may create gestures that are specific to a particular application program.

In some configurations, the touchscreen 1442 supports a tap gesture in which a user taps the touchscreen 1442 once on an item presented on the display 1440. The tap gesture may be used for various reasons including, but not limited to, opening or launching whatever the user taps. In some configurations, the touchscreen 1442 supports a double tap gesture in which a user taps the touchscreen 1442 twice on an item presented on the display 1440. The double tap gesture may be used for various reasons including, but not limited to, zooming in or zooming out in stages. In some configurations, the touchscreen 1442 supports a tap and hold gesture in which a user taps the touchscreen 1442 and maintains contact for at least a pre-defined time. The tap and hold gesture may be used for various reasons including, but not limited to, opening a context-specific menu.

In some configurations, the touchscreen 1442 supports a pan gesture in which a user places a finger on the touchscreen 1442 and maintains contact with the touchscreen 1442 while moving the finger on the touchscreen 1442. The pan gesture may be used for various reasons including, but not limited to, moving through screens, images, or menus at a controlled rate. Multiple finger pan gestures are also contemplated. In some configurations, the touchscreen 1442 supports a flick gesture in which a user swipes a finger in the direction the user wants the screen to move. The flick gesture may be used for various reasons including, but not limited to, scrolling horizontally or vertically through menus or pages. In some configurations, the touchscreen 1442 supports a pinch and stretch gesture in which a user makes a pinching motion with two fingers (e.g., thumb and forefinger) on the touchscreen 1442 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1442. As such, the above gestures should be understood as being illustrative and should not be construed as being limiting in any way.

The data I/O interface component 1444 is configured to facilitate input of data to the computing device and output of data from the computing device. In some configurations, the data I/O interface component 1444 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1446 is configured to provide audio input and/or output capabilities to the computing device. In some configurations, the audio I/O interface component 1446 includes a microphone configured to collect audio signals. In some configurations, the audio I/O interface component 1446 includes a headphone jack configured to provide connectivity for headphones or other external speakers. In some configurations, the audio I/O interface component 1446 includes a speaker for the output of audio signals. In some configurations, the audio I/O interface component 1446 includes an optical audio cable out.

The video I/O interface component 1448 is configured to provide video input and/or output capabilities to the computing device. In some configurations, the video I/O interface component 1448 includes a video connector configured to receive video as input from another device (e.g., a video media player such as a DVD or BLURAY player) or send video as output to another device (e.g., a monitor, a television, or some other external display). In some configurations, the video I/O interface component 1448 includes a High-Definition Multimedia Interface ("HDMI"), mini-HDMI, micro-HDMI, DisplayPort, or proprietary connector to input/output video content. In some configurations, the video I/O interface component 1448 or portions thereof is combined with the audio I/O interface component 1446 or portions thereof.

The camera 1450 can be configured to capture still images and/or video. The camera 1450 may utilize a charge coupled device ("CCD") or a complementary metal oxide semiconductor ("CMOS") image sensor to capture images. In some configurations, the camera 1450 includes a flash to aid in taking pictures in low-light environments. Settings for the camera 1450 may be implemented as hardware or software buttons.

Although not illustrated, one or more hardware buttons may also be included in the computing device architecture 1400. The hardware buttons may be used for controlling some operational aspect of the computing device. The hardware buttons may be dedicated buttons or multi-use buttons. The hardware buttons may be mechanical or sensor-based.

The illustrated power components 1414 include one or more batteries 1452, which can be connected to a battery gauge 1454. The batteries 1452 may be rechargeable or disposable. Rechargeable battery types include, but are not limited to, lithium polymer, lithium ion, nickel cadmium, and nickel metal hydride. Each of the batteries 1452 may be made of one or more cells.

The battery gauge 1454 can be configured to measure battery parameters such as current, voltage, and temperature. In some configurations, the battery gauge 1454 is configured to measure the effect of a battery's discharge rate, temperature, age and other factors to predict remaining life within a certain percentage of error. In some configurations, the battery gauge 1454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1412 may also include a power connector, which may be combined with one or more of the aforementioned I/O components 1410. The power components 1412 may interface with an external power system or charging equipment via an I/O component.

The disclosure presented herein may be considered in view of the following clauses.

Clause A: A computer-implemented method, comprising: receiving content data comprising a plurality of sections, wherein individual sections of the plurality of sections comprise content describing one or more topics; receiving contextual data from one or more computing devices; analyzing the contextual data to generate data defining at least one topic of interest; selecting at least one section from the plurality of sections, wherein the at least one section comprises content describing one or more topics related to the at least one topic of interest; and causing a display of the at least one section on a hardware display surface of at least one device of the one or more computing devices, wherein the hardware display surface is configured to display at least a portion of content of the at least one section with a real-world view of an object through the hardware display surface or a rendered object displayed on the hardware display surface.

Clause B: The computer-implemented method of Clause A, wherein the contextual data identifies a gaze target, and wherein the at least one topic of interest is determined based on at least in part the contextual data identifying the gaze target.

Clause C: The computer-implemented method of Clauses A-B, wherein the contextual data identifies a gaze direction, and wherein the at least one topic of interest is determined based, at least in part, on the contextual data identifying the gaze direction.

Clause D: The computer-implemented method of Clauses A-C, wherein the at least the portion of the content of the at least one section is displayed within a graphical element configured to indicate an association between the graphical element and the object or the rendered object.

Clause E: The computer-implemented method of Clauses A-D, wherein processing the contextual data to generate data defining the at least one topic of interest comprises identifying one or more keywords, and wherein selecting at least one section from the plurality of sections comprises: determining that the at least one section contains content related to the one or more keywords; and selecting the at least one section based, at least in part, on the determination that the at least one section contains content related to the one or more keywords.

Clause F: The computer-implemented method of Clauses A-E, further comprising: generating a query configured to obtain additional contextual data from one or more remote computing devices, wherein the query is based, at least in part, on the topic of interest; communicating the query to the one or more remote computing devices; retrieving the additional contextual data in response to the query; and causing a display of a graphical element containing the additional contextual data, wherein the graphical element is configured to indicate an association between the graphical element and the object or the rendered object.

Clause G: The computer-implemented method of Clauses A-F, further comprising: obtaining calibration data comprising values that correlate one or more eye positions with one or more sections of the interface; obtaining sensor data indicating an eye position; obtaining position data indicating at least one section of the interface where the rendered object is displayed; and identifying the rendered object as a gaze target based, at least in part, on the position data, the sensor data, and the calibration data, and wherein the at least one topic of interest is determined based, at least in part, on the gaze target.

Clause H: The computer-implemented method of Clauses A-G, further comprising: obtaining image data from a camera directed toward the object; analyzing the image data to determine if the image data includes at least one image having a position of the object within a pre-determined area of the at least one image; and determining that the object is the gaze target if the image data includes the at least one image having the position of the object within the pre-determined area of the at least one image.

Clause I: The computer-implemented method of Clauses A-H, further comprising: generating a notification indicating a recommendation of the at least one section; receiving input data indicating an approval of the recommendation of the at least one section; and causing the display of the at least one section on the hardware display surface of the at least one device in response to receiving the input data indicating the approval of the recommendation of the at least one section.

Clause J: A computing device, comprising: a processor; and a memory having computer-executable instructions stored thereupon which, when executed by the processor, cause the computing device to obtain content data comprising a plurality of sections, wherein individual sections of the plurality of sections comprise content describing one or more topics, receive contextual data from one or more devices identifying a topic of interest, select at least one section from the plurality of sections, wherein the at least one section comprises content describing one or more topics related to the topic of interest, and communicate data defining the at least one section to at least one device of the one or more devices.

Clause K: The computing device of Clause J, wherein the contextual data identifies a gaze target, and wherein the at least one section is selected based, at least in part, on the contextual data identifying the gaze target.

Clause L: The computing device of Clauses J-K, wherein the contextual data identifies a gaze direction, and wherein the at least one section is selected based, at least in part, on the contextual data identifying the gaze direction.

Clause M: The computing device of Clauses J-L, wherein the computer-executable instructions further cause the computing device to: process the contextual data to cause a generation of one or more keywords, and wherein selecting at least one section from the plurality of sections comprises, determining that the at least one section contains content related to the one or more keywords, and selecting the at least one section based, at least in part, on the determination that the at least one section contains content related to the one or more keywords.

Clause N: The computing device of Clauses J-M, wherein the computer-executable instructions further cause the computing device to: generate a query configured to obtain additional contextual data from one or more remote computing devices, wherein the query is based, at least in part, on the contextual data; communicate the query to the one or more remote computing devices; retrieve the additional contextual data in response to the query; and communicating the additional contextual data to the at least device.

Clause O: The computing device of Clauses J-N, wherein the contextual data identifies a rendered object as a gaze target based, at least in part, on sensor data indicating an eye position, and wherein the at least one at least one section is selected based, at least in part, on data identifying the gaze target.

Clause P: A computer storage medium having computer-executable instructions stored thereupon which, when executed by a computing device, cause the computing device to: obtain content data comprising a plurality of sections, wherein individual sections of the plurality of sections comprise content describing one or more topics; receive contextual data from one or more devices identifying a topic of interest; select at least one section from the plurality of sections, wherein the at least one section comprises content describing one or more topics related to the topic of interest; and cause a display of the at least one section on a hardware display surface of at least one device of the one or more devices.

Clause Q: The computer storage medium of Clause P, wherein the computer-executable instructions further cause the computing device to: generate a notification indicating a recommendation of the at least one section; receive input data indicating an approval of the recommendation of the at least one section; cause the display of the at least one section on the hardware display surface of the at least one device in response to receiving the input data indicating the approval of the recommendation of the at least one section; generating data indicating a performance metric associated with the recommendation; and selecting a second set of sections of the plurality of sections based, at least in part, on the contextual data and the performance metric.

Clause R: The computer storage medium of Clauses P-Q, wherein the computer-executable instructions further cause the computing device to: process the contextual data to identify one or more keywords, and wherein selecting at least one section from the plurality of sections comprises determine that the at least one section contains content related to the one or more keywords, and select the at least one section based, at least in part, on the determination that the at least one section contains content related to the one or more keywords.

Clause S: The computer storage medium of Clauses P-R, wherein the contextual data includes communication data from the one or more devices.

Clause T: The computer storage medium of Clauses P-S, wherein the contextual data includes gesture data from the one or more devices, wherein the gesture data indicates an interaction with an object related to the topic of interest.

Clause U: A computing device, comprising: a processor; an interface having a selectable section of variable transparency, wherein the section is configured to provide a real-world view of a physical object through the interface, and wherein the interface is configured to display a rendered object; at least one sensor configured to determine a position of at least one eye of a user; a memory having a set of computer-executable instructions stored thereupon which, when executed by the processor, cause the first computing device to determine that the physical object is a gaze target based, at least in part, on data indicating the position of the at least one eye and data indicating a location of the selectable section, or determine that the rendered object is the gaze target based, at least in part, on data indicating the position of the at least one eye and data indicating a location of the rendered object.

Clause V: A method of comprising: obtaining calibration data comprising values that correlate one or more eye positions with one or more sections of the interface; obtaining sensor data indicating an eye position; obtaining position data indicating at least one section of the interface where the rendered object is displayed; and identifying a rendered object as a gaze target based, at least in part, on the position data, the sensor data, and the calibration data, and wherein the at least one topic of interest is determined based, at least in part, on the gaze target.

Clause W: The method of Clause V, further comprising: obtaining image data from a camera directed toward the object; analyzing the image data to determine if the image data includes at least one image having a position of the object within a pre-determined area of the at least one image; and determining that the object is the gaze target if the image data includes the at least one image having the position of the object within the pre-determined area of the at least one image.

Based on the foregoing, it should be appreciated that concepts and technologies have been disclosed herein that provide, among other techniques, context-aware recommendations of relevant presentation content displayed in mixed environments. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
    receiving presentation data comprising a plurality of pages, wherein an individual page of the plurality of pages comprises content describing one or more topics;
    receiving contextual data from one or more remote computing devices, the contextual data comprising communication data between the one or more remote computing devices operated by users viewing a real-world object, the communication data identifying a component of the real-world object;
    analyzing the contextual data to generate data defining at least one topic of interest related to the component of the real-world object;
    selecting at least one page from the plurality of pages based on a number of the users viewing the component of the real-world object, wherein the at least one page comprises content describing one or more topics related to the at least one topic of interest; and
    causing a display of the at least one page on a hardware display surface of at least one device of the one or more computing devices, wherein the hardware display surface is configured to display at least a portion of content of the at least one page with a real-world view of the real-world object through the hardware display surface or a computer-generated rendering of the real-world object displayed on the hardware display surface.

2. The computer-implemented method of claim 1, wherein the contextual data identifies a gaze direction of the users viewing the real-world object for determining the component of the real-world object, and wherein the at least one topic of interest is determined based, at least in part, on the contextual data identifying the gaze direction.

3. The method of claim 1, wherein the at least the portion of the content of the at least one page is displayed within a graphical element configured to indicate an association between the graphical element and the real-world object or the rendered object.

4. The method of claim 1, wherein processing the contextual data to generate data defining the at least one topic of interest comprises identifying one or more keywords, and wherein selecting at least one page from the plurality of pages comprises:
    determining that the at least one page contains content related to the one or more keywords; and
    selecting the at least one page based, at least in part, on the determination that the at least one page contains content related to the one or more keywords.

5. The method of claim 1, further comprising:
    generating a query configured to obtain additional contextual data from one or more computing devices, wherein the query is based, at least in part, on the topic of interest;
    communicating the query to the one or more remote computing devices;
    retrieving the additional contextual data in response to the query; and
    causing a display of a graphical element containing the additional contextual data, wherein the graphical element is configured to indicate an association between the graphical element and the real-world object or the rendered object.

6. The method of claim 1, further comprising:
    obtaining image data from a camera directed toward the component of the real-world object;
    analyzing the image data to determine if the image data includes at least one image having a position of the component of the real-world object within a pre-determined area of the at least one image; and
    determining that the component of the real-world object is the gaze target if the image data includes the at least one image having the position of the component of the real-world object within the pre-determined area of the at least one image.

7. The computer-implemented method of claim 1, wherein the communication data identifies the component of the real-world object for causing the display of the at least one page describing the one or more related topics related to the component of the real-world object.

8. The computer-implemented method of claim 1, wherein the communication data comprises voice commands that identifies the component, wherein the voice commands are provided by the remote computing devices operated by the users viewing the real-world object, the voice commands causing a selection and display of the at least one page describing one or more topics about the component.

9. The computer-implemented method of claim 1, wherein the display further comprises a number of pages selected from the plurality of pages based on a number of users viewing the component of the real-world object.

10. The computer-implemented method of claim 1, wherein the display further comprises a number of ranked pages from the plurality of pages, wherein a ranking of an individual page of the ranked pages is based on a number of users viewing the component of the real-world object.

11. The computer-implemented method of claim 1, wherein the at least one page is ranked higher than a secondary page of the plurality of pages in the display in response to determining that a first number of users viewing the component is greater than a second number of users viewing another component associated with another page of the plurality of pages.

12. A computing device, comprising:
    a processor; and
    a memory having computer-executable instructions stored thereupon which, when executed by the processor, cause the computing device to
        obtain presentation data comprising a plurality of pages, wherein an individual page of the plurality of pages comprises content describing one or more topics,
        receive contextual data from one or more remote devices, the contextual data comprising communication data between the one or more remote devices operated by users viewing a real-world object, the communication data identifying a component of the real-world object,
        select at least one page from the plurality of pages based on a number of the users viewing the component of the real-world object, wherein the at least one page comprises content describing the component of the real-world object, and
        communicate data defining the at least one page to at least one device of the one or more remote devices.

13. The computing device of claim 12, wherein the contextual data identifies a gaze target of the users viewing the real-world object, and wherein the at least one page is also selected based, at least in part, on the contextual data identifying the gaze target.

14. The computing device of claim 12, wherein the contextual data identifies a gaze direction, and wherein the at least one page is also selected based, at least in part, on the contextual data identifying the gaze direction.

15. The computing device of claim 12, wherein the computer-executable instructions further cause the computing device to:
process the contextual data to cause a generation of one or more keywords, and wherein selecting at least one page from the plurality of pages comprises,
determining that the at least one page contains content related to the one or more keywords, and
selecting the at least one page based, at least in part, on the determination that the at least one page contains content related to the one or more keywords.

16. The computing device of claim 12, wherein the computer-executable instructions further cause the computing device to:
generate a query configured to obtain additional contextual data from the one or more remote computing devices, wherein the query is based, at least in part, on the contextual data;
communicate the query to the one or more remote computing devices;
retrieve the additional contextual data in response to the query; and
communicate the additional contextual data to the at least one device.

17. The computing device of claim 12, wherein the contextual data identifies a rendered object as a gaze target based, at least in part, on sensor data indicating an eye position, and wherein the at least one page is selected based, at least in part, on data identifying the gaze target.

18. A computer storage medium having computer-executable instructions stored thereupon which, when executed by a computing device, cause the computing device to:
obtain presentation data comprising a plurality of pages, wherein an individual page of the plurality of pages comprises content describing one or more topics;
receive contextual data from one or more remote devices, the contextual data comprising communication data between the one or more remote devices operated by users viewing a real-world object, the communication data identifying a component of the real-world object;
select at least one page from the plurality of pages based on a number of the users viewing the component of the real-world object, wherein the at least one page comprises content describing the component of the real-world object; and
cause a display of the at least one page on a hardware display surface of at least one device of the one or more devices.

19. The computer storage medium of claim 18, wherein the computer-executable instructions further cause the computing device to:
generate a notification indicating a recommendation of the at least one page;
receive input data indicating an approval of the recommendation of the at least one page;
cause the display of the at least one page on the hardware display surface of the at least one device in response to receiving the input data indicating the approval of the recommendation of the at least one page;
generate data indicating a performance metric associated with the recommendation; and
select a second set of pages of the plurality of pages based, at least in part, on the contextual data and the performance metric.

20. The computer storage medium of claim 18, wherein the computer-executable instructions further cause the computing device to:
process the contextual data to identify one or more keywords, and wherein selecting at least one page from the plurality of pages comprises
determining that the at least one page contains content related to the one or more keywords, and
selecting the at least one page based, at least in part, on the determination that the at least one page contains content related to the one or more keywords.

* * * * *